US012003523B2

(12) United States Patent
Yamamoto et al.

(10) Patent No.: US 12,003,523 B2
(45) Date of Patent: Jun. 4, 2024

(54) MODEL GENERATION APPARATUS, MODEL GENERATION METHOD, AND COMPUTER READABLE MEDIUM

(71) Applicant: Mitsubishi Electric Corporation, Tokyo (JP)

(72) Inventors: Takumi Yamamoto, Tokyo (JP); Aiko Iwasaki, Tokyo (JP); Hisashi Fukuda, Tokyo (JP); Kiyoto Kawauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 211 days.

(21) Appl. No.: 17/828,373

(22) Filed: May 31, 2022

(65) Prior Publication Data

US 2022/0303294 A1    Sep. 22, 2022

Related U.S. Application Data

(63) Continuation of application No. PCT/JP2020/002334, filed on Jan. 23, 2020.

(51) Int. Cl.
*G06F 15/16* (2006.01)
*G06F 9/54* (2006.01)
(Continued)

(52) U.S. Cl.
CPC ............... *H04L 63/1425* (2013.01)

(58) Field of Classification Search
CPC ............ H04L 63/1425; H04L 63/1408; G06F 21/552; G06F 21/554
(Continued)

(56) References Cited

U.S. PATENT DOCUMENTS 9,154,516 B1 * 10/2015 Vaystikh ............. H04L 63/1425
10,129,118 B1 * 11/2018 Ghare .................. H04L 43/028
(Continued)

FOREIGN PATENT DOCUMENTS

JP         4-302344 A      10/1992
JP      2004-186878 A       7/2004
(Continued)

OTHER PUBLICATIONS

"Cyber Attack Detection Technology", Mitsubishi Electric, [online] Retrieved from the Internet: Japanese website <http://www.mitsubishielectric.co.jp/corporate/randd/spotlight/a35/index.html>, retrieved on Feb. 4, 2022, total 12 pages.
(Continued)

*Primary Examiner* — Hamza N Algibhah
(74) *Attorney, Agent, or Firm* — Birch, Stewart, Kolasch & Birch, LLP

(57) ABSTRACT

An attribute-value extraction unit (101) extracts as a plurality of model-generation attribute values, a plurality of attribute values belonging to an attribute associated with a monitoring subject for anomaly detection. A division-data generation unit (102) extracts for each model-generation attribute value, a normal event associated with the model-generation attribute value from normal data indicating a plurality of normal events each of which is found out to be normal, each of which is associated with one attribute value of the plurality of attribute values, and each of which includes a plurality of characteristics, and generates for each model-generation attribute value, division data indicating the extracted normal event. A characteristic selection unit (103) selects a combination of characteristics to be used for generation of a normal model to be used for anomaly detection, from a plurality of characteristics included in a plurality of normal events indicated in a plurality of pieces
(Continued)

of division data. A normal-model generation unit (104) generates the normal model for each model-generation attribute value, using the combination of characteristics selected.

9 Claims, 22 Drawing Sheets

(51) Int. Cl.
*H04L 9/40* (2022.01)
*H04L 29/06* (2006.01)

(58) Field of Classification Search
USPC .......................................................... 726/23
See application file for complete search history.

(56) References Cited

U.S. PATENT DOCUMENTS

| | | | |
|---|---|---|---|
| 2005/0203881 A1 | 9/2005 | Sakamoto et al. | |
| 2006/0074621 A1* | 4/2006 | Rachman | G06Q 90/00 703/22 |
| 2007/0074272 A1 | 3/2007 | Watanabe | |
| 2008/0263661 A1* | 10/2008 | Bouzida | H04L 63/1416 726/22 |
| 2011/0214161 A1* | 9/2011 | Stolfo | H04L 63/102 726/4 |
| 2015/0052606 A1* | 2/2015 | Romero Bueno | H04L 63/1425 726/23 |
| 2017/0061322 A1 | 3/2017 | Chari et al. | |
| 2017/0083815 A1* | 3/2017 | Sanchez Charles | G06F 21/552 |
| 2017/0206458 A1 | 7/2017 | Sakamoto et al. | |
| 2017/0208080 A1 | 7/2017 | Sakamoto et al. | |
| 2019/0004923 A1 | 1/2019 | Ariga | |
| 2019/0260786 A1* | 8/2019 | Dunn | G06F 16/2455 |
| 2020/0198128 A1* | 6/2020 | Hatanaka | G06N 20/00 |
| 2020/0344252 A1* | 10/2020 | Menon | G06F 11/3006 |
| 2021/0157909 A1* | 5/2021 | Yamamoto | G06F 11/34 |
| 2021/0367829 A1* | 11/2021 | Zeng | H04L 41/069 |
| 2022/0294715 A1* | 9/2022 | Agrawal | H04L 43/04 |
| 2022/0294811 A1* | 9/2022 | Yamamoto | H04L 63/1416 |

FOREIGN PATENT DOCUMENTS

| | | |
|---|---|---|
| JP | 2004-312083 A | 11/2004 |
| JP | 2005-259140 A | 9/2005 |
| JP | 2007-96735 A | 4/2007 |
| JP | 2017-126282 A | 7/2017 |
| JP | 2017-126283 A | 7/2017 |
| JP | 2019-3533 A | 1/2019 |
| JP | 2019-8711 A | 1/2019 |

OTHER PUBLICATIONS

"Results of a Survey on the Latest Trends and Future Estimates of IT Human Resources—Report Summary Version", Minister of Economy, Trade and Industry of Japan, Jun. 10, 2016, total 36 pages.
"Mitsubishi Electric Develops Cyber Attack Detection Technology", Mitsubishi Electric Corporation, Feb. 17, 2016, 2 pages.
Hock et al., "A Pre-Clustering Method to Improve Anomaly Detection", Conference Paper, Jul. 2016, total 7 pages.
International Search Report, issued in PCT/JP2020/002334, dated Apr. 14, 2020.
International Search Report, issued in PCT/JP2020/002335, dated Apr. 14, 2020.
Written Opinion of the International Searching Authority, issued in PCT/JP2020/002334, dated Apr. 14, 2020.
Written Opinion of the International Searching Authority, issued in PCT/JP2020/002335, dated Apr. 14, 2020.
U.S. Office Action for U.S. Appl. No. 17/828,149, dated Mar. 4, 2024.

* cited by examiner

Fig. 6

| IP ADDRESS | TIME STAMP | URL | DOMAIN | SIZE | STATUS | ... |
|---|---|---|---|---|---|---|
| IP1 | T1 | URL1 | DOMAIN 1 | SIZE 1 | STATUS 1 | ... |
| IP2 | T2 | URL2 | DOMAIN 2 | SIZE 2 | STATUS 2 | ... |
| ... | ... | ... | ... | ... | ... | |

Fig. 7

| ATTRIBUTE | REFERENCE ITEM | EXTRACTION METHOD | HIERARCHICAL STRUCTURE |
|---|---|---|---|
| AFFILIATION | USER ACCOUNT | EXTRACT USER ACCOUNT FROM EACH RECORD OF LOG, AND REFER TO AFFILIATION IN IN-HOUSE DIRECTORY INFORMATION. IF USER ACCOUNT IS NOT INCLUDED IN LOG, SPECIFY USER ACCOUNT FROM IP ADDRESS. SPECIFY LINKAGE BETWEEN IP ADDRESS AND USER ACCOUNT, USING LOG OF AD SERVER. | No |
| POST | USER ACCOUNT | EXTRACT USER ACCOUNT FROM EACH RECORD OF LOG, AND REFER TO POST IN IN-HOUSE DIRECTORY INFORMATION. IF USER ACCOUNT IS NOT INCLUDED IN LOG, SPECIFY USER ACCOUNT FROM IP ADDRESS. SPECIFY LINKAGE BETWEEN IP ADDRESS AND USER ACCOUNT, USING LOG OF AD SERVER. | Yes |
| ... | ... | | |
| PERIOD OF TIME | TIME STAMP | EXTRACT TIME STAMP FROM EACH RECORD OF LOG. CHECK WHETHER TIME OF TIME STAMP IS PREDETERMINED BUSY SEASON OR SLOW SEASON | No |

Fig. 8

| CHARACTERISTIC | TYPE OF LOG | EXTRACTION METHOD |
|---|---|---|
| IP ADDRESS | PROXY LOG, FILE SERVER LOG, AUTHENTICATION SERVER LOG | EXTRACT CHARACTER STRING OF IP ADDRESS FROM x-TH (x IS SET FOR EACH TYPE OF LOG) FIELD OF EACH RECORD OF LOG |
| URL | PROXY LOG | EXTRACT CHARACTER STRING OF HTTP REQUEST STATEMENT FROM x-TH (x IS SET FOR EACH TYPE OF LOG) FIELD OF EACH RECORD OF LOG, AND REMOVE METHOD AND HTTP VERSION. |
| DOMAIN | PROXY LOG | EXTRACT CHARACTER STRING FROM "http://" TO NEXT SLASH ("/") FROM CHARACTER STRING OF EXTRACTED URL |
| ... | ... | ... |
| TIME RANGE | PROXY LOG, FILE SERVER LOG, AUTHENTICATION SERVER LOG | EXTRACT CHARACTER STRING OF TIME STAMP FROM x-TH (x IS SET FOR EACH TYPE OF LOG) FIELD OF EACH RECORD OF LOG, AND CLASSIFY INTO CATEGORY OF EACH TIME RANGE |

Fig. 9

| ATTRIBUTE | COMBINATION OF CHARACTERISTICS | DISCRIMINATOR |
|---|---|---|
| AFFILIATION | PROXY LOG (ACCESS INTERVAL, ACCESS TIME RANGE, ACCESS DOMAIN, RESPONSE SIZE), FILE SERVER LOG (ACCESS INTERVAL, ACCESS TIME RANGE, ACCESSED FILE NAME), AUTHENTICATION SERVER LOG (AUTHENTICATION TIME RANGE, AUTHENTICATION INTERVAL, SUCCESS/FAILURE OF AUTHENTICATION) | DISCRIMINATOR OF AFFILIATION |
| POST | PROXY LOG (ACCESS INTERVAL, ACCESS TIME RANGE, ACCESS DOMAIN, RESPONSE SIZE), FILE SERVER LOG (ACCESS INTERVAL, ACCESS TIME RANGE, ACCESSED FILE NAME), AUTHENTICATION SERVER LOG (AUTHENTICATION TIME RANGE, AUTHENTICATION INTERVAL, SUCCESS/FAILURE OF AUTHENTICATION) | DISCRIMINATOR OF POST |
| ... | | |
| TIME OF PERIOD | PROXY LOG (ACCESS INTERVAL, ACCESS DOMAIN, RESPONSE SIZE), FILE SERVER LOG (ACCESS INTERVAL, ACCESSED FILE NAME), AUTHENTICATION SERVER LOG (AUTHENTICATION TIME RANGE, AUTHENTICATION INTERVAL, SUCCESS/FAILURE OF AUTHENTICATION) | DISCRIMINATOR OF PERIOD OF TIME |

Fig. 10

| ATTRIBUTE | ATTRIBUTE VALUE | NORMAL MODEL |
|---|---|---|
| AFFILIATION | HUMAN RESOURCES DEPARTMENT | PATH TO NORMAL MODEL OF HUMAN RESOURCES DEPARTMENT |
| | GENERAL AFFAIRS DEPARTMENT | PATH TO NORMAL MODEL OF GENERAL AFFAIRS DEPARTMENT |
| | SALES DEPARTMENT | PATH TO NORMAL MODEL OF SALES DEPARTMENT |
| | DEVELOPMENT DEPARTMENT | PATH TO NORMAL MODEL OF DEVELOPMENT DEPARTMENT |
| POST | PRESIDENT | PATH TO NORMAL MODEL OF PRESIDENT |
| | EXECUTIVE OFFICER | PATH TO NORMAL MODEL OF EXECUTIVE OFFICER |
| | DIRECTOR | PATH TO NORMAL MODEL OF DIRECTOR |
| | DEPARTMENT MANAGER | PATH TO NORMAL MODEL OF DEPARTMENT MANAGER |
| | DEPARTMENT CHIEF | PATH TO NORMAL MODEL OF DEPARTMENT CHIEF |
| | STAFF | PATH TO NORMAL MODEL OF STAFF |
| ... | ... | ... |

Fig. 11

| MONITORING SUBJECT | | ATTRIBUTE 1 (AFFILIATION) | ATTRIBUTE 2 (POST) | ... | ATTRIBUTE N (PERIOD OF TIME) |
|---|---|---|---|---|---|
| 192.168.1.5 | AFTER-CHANGE ATTRIBUTE VALUE | - HUMAN RESOURCES DEPARTMENT<br>- PATH TO NORMAL MODEL<br>- 2019/10/01/00:00:00<br>- IN OPERATION<br>- WEIGHT: 0.5 | - DEPARTMENT CHIEF<br>- PATH TO NORMAL MODEL<br>- 2019/10/01/00:00:00<br>- OUT OF OPERATION<br>- WEIGHT: 0.3 | ... | - SLOW SEASON<br>- PATH TO NORMAL MODEL<br>- 2019/10/15/00:00:00<br>- IN OPERATION<br>- WEIGHT: 0.2 |
| | BEFORE-CHANGE ATTRIBUTE VALUE | - GENERAL AFFAIRS DEPARTMENT<br>- PATH TO NORMAL MODEL<br>- 2016/10/01/00:00:00 | - STAFF<br>- PATH TO NORMAL MODEL<br>- 2016/10/01/00:00:00 | ... | - BUSY SEASON<br>- PATH TO NORMAL MODEL<br>- 2019/09/15/00:00:00 |
| 192.168.1.6 | AFTER-CHANGE ATTRIBUTE VALUE | - SALES DEPARTMENT<br>- PATH TO NORMAL MODEL<br>- 2019/04/01/00:00:00<br>- IN OPERATION<br>- WEIGHT: 0.5 | - STAFF<br>- PATH TO NORMAL MODEL<br>- 2019/10/01/00:00:00<br>- OUT OF OPERATION<br>- WEIGHT: 0.3 | ... | - SLOW SEASON<br>- PATH TO NORMAL MODEL<br>- 2019/10/15/00:00:00<br>- IN OPERATION<br>- WEIGHT: 0.2 |
| | BEFORE-CHANGE ATTRIBUTE VALUE | - DEVELOPMENT DEPARTMENT<br>- PATH TO NORMAL MODEL<br>- 2014/04/01/00:00:00 | - STAFF<br>- PATH TO NORMAL MODEL<br>- 2016/10/01/00:00:00 | ... | - BUSY SEASON<br>- PATH TO NORMAL MODEL<br>- 2019/09/15/00:00:00 |
| ... | | ... | ... | | ... |

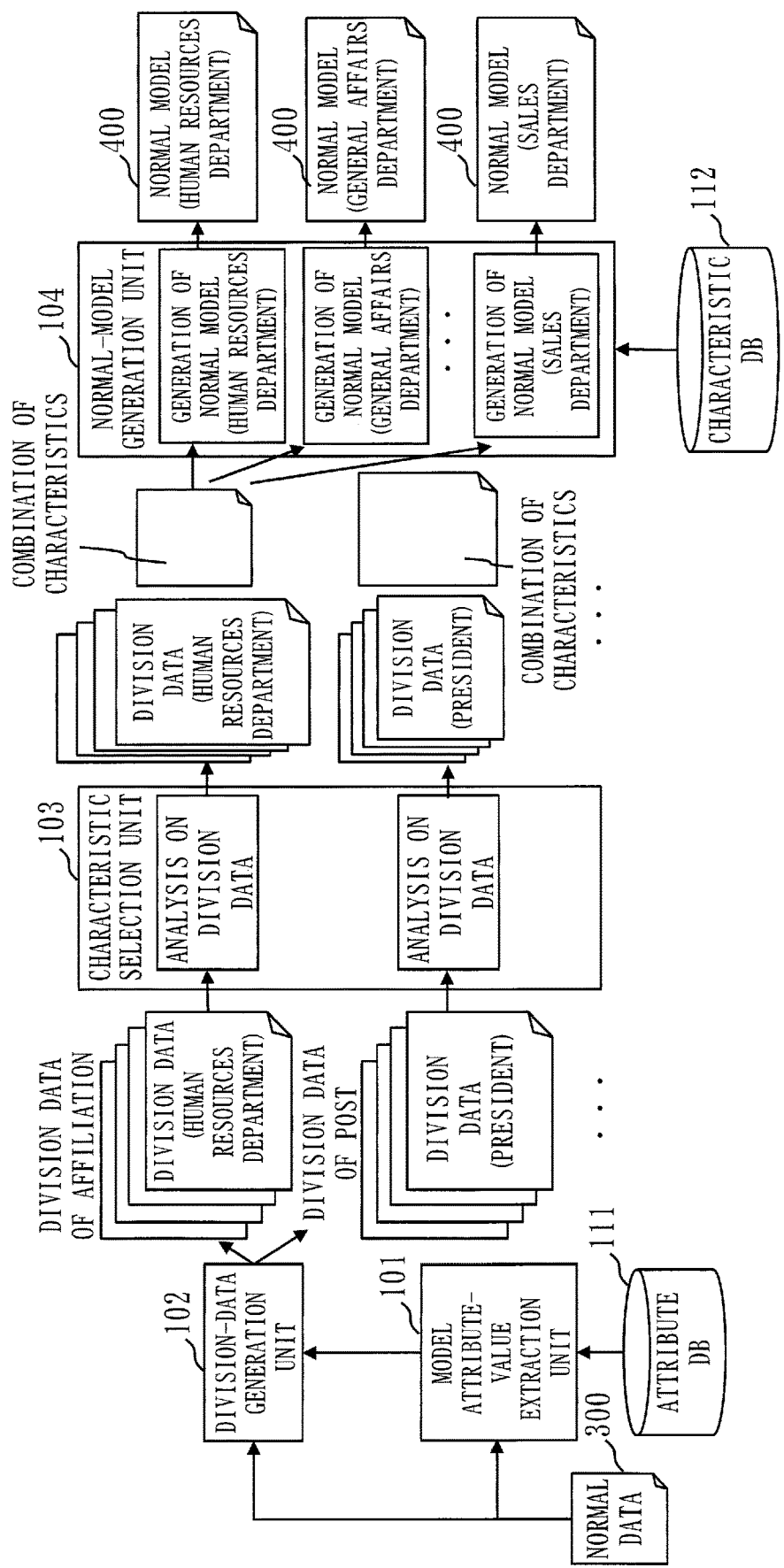

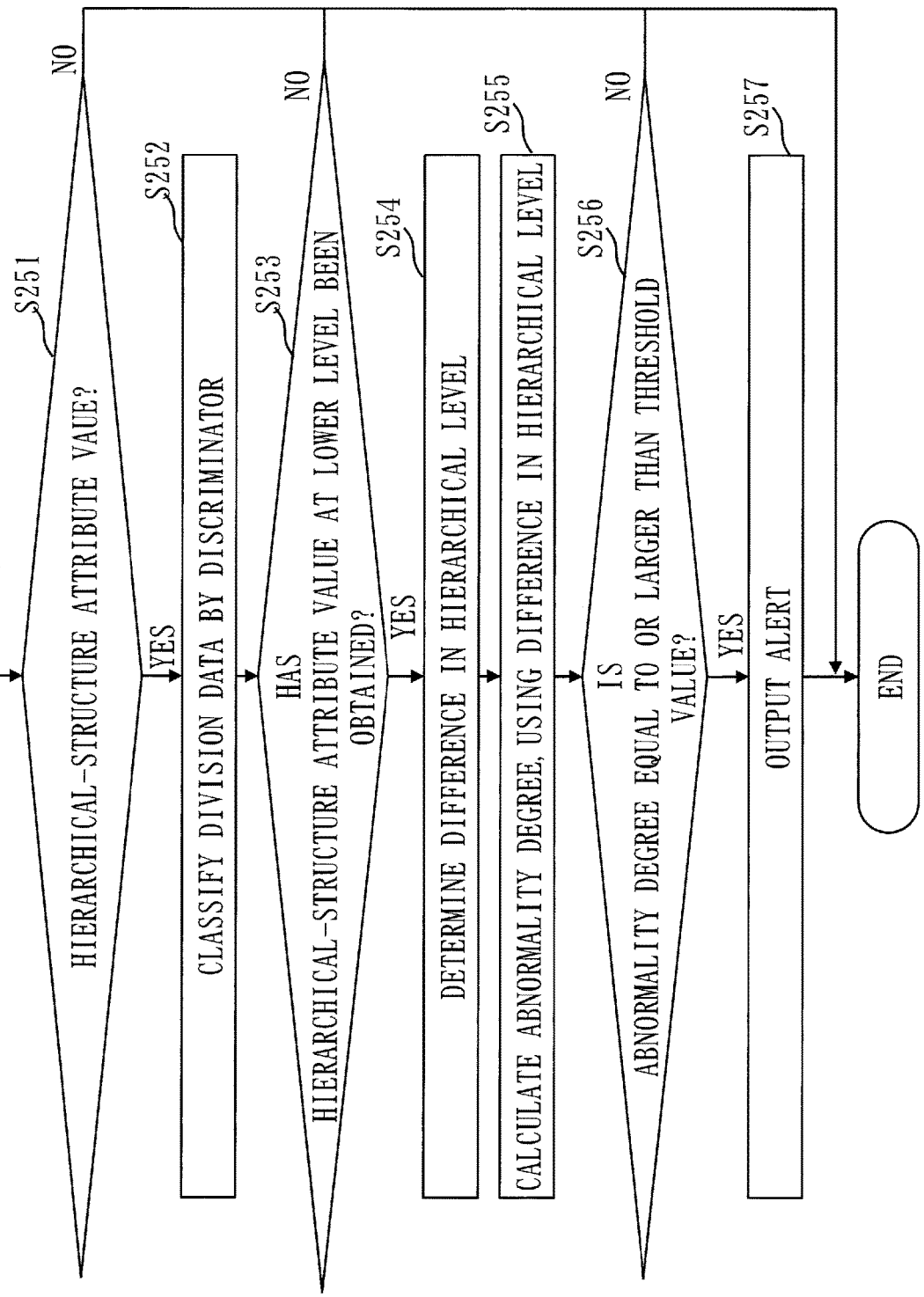

MODEL GENERATION APPARATUS, MODEL GENERATION METHOD, AND COMPUTER READABLE MEDIUM

CROSS REFERENCE TO RELATED APPLICATIONS

This application is a Continuation of PCT International Application No. PCT/JP2020/002334, filed on Jan. 23, 2020, which is hereby expressly incorporated by reference into the present application.

TECHNICAL FIELD

The present disclosure relates to an anomaly detection technique.

BACKGROUND ART

In recent years, targeted attacks which target specific companies or specific organizations have increased. The targeted attack on the Japan Pension Service taken placed in 2015 is fresh in people's mind. Further, as control systems have been networked, cyber-attacks on critical infrastructures such as a power plant and a gas plant have become a threat. As described above, the cyber-attacks have been critical matters of concern which destabilize national security. There are the Tokyo Olympic and Paralympic Games coming up in 2020, which attract worldwide attention, and the games are expected to be easy targets for attackers. If a function of a critical infrastructure stops due to the cyber-attacks during a period of time of the games, game management is largely obstructed.

On the other hand, on a site of security monitoring, in a current situation, shortage of staffs who have specialized knowledge has been usual. According to a survey report from the Ministry of Economy, Trade and Industry of Japan, there is shortage of 132,060 information security experts as of 2016. Further, shortage of 193,010 experts is expected in in 2020. Therefore, even with a small number of staffs, a technique that can efficiency detect the cyber-attack with high accuracy is required.

As a technique for detecting the cyber-attack, a rule-based detection technique using a rule on an attack and/or a normal state has been well known conventionally. However, due to the sophistication of the attacks and increase of unknown attacks, it is difficult to define the rule in advance, which puzzles monitoring staffs. Therefore, an advanced detection technique which does not require defining the rule in advance is desired. Artificial Intelligence (hereinafter, abbreviated as AI) such as machine learning is expected as a technique which realizes this.

The AI learns a plurality of classes of data prepared in advance, and automatically finds out a boundary that separates the classes. If a large amount of data for each class can be prepared, the AI can properly find out the boundary. If the AI can be applied to the monitoring of the cyber-attack, it is expected that the AI can replace the definition and update of the rule which have been so far performed by staffs who have specialized knowledge and skills.

However, in network security, there is a problem that it is difficult to prepare a large amount of data for each class, which is the most important for the AI. Especially, regarding the attacks, occurrence of the attack is rare, and it is very difficult to prepare a large amount of attack data for the purpose of learning. Therefore, an AI technique is required which can effectively detect the attack as an abnormality even in an environment with a little amount of attack data or no attack data at all.

As a typical example of such technique, an anomaly detection technique has been known. In the anomaly detection technique, only normal data is learned and normal behavior is modeled as a normal model. Then, in the anomaly detection technique, behavior deviating from the normal model is detected as an abnormality.

Non-Patent Literature 1 discloses a technique of dividing normal data based on a tendency in the normal data and generating a normal model for each piece of division data obtained by the division.

CITATION LIST

Non-Patent Literature

Non-Patent Literature 1: Denis Hock, Martin Kappes, Bogdan V. Ghita, "A Pre-clustering Method To Improve Anomaly Detection"

SUMMARY OF INVENTION

Technical Problem

The normal data includes various attributes (for example, an affiliation, a post, a period of time, and the like), and there are not few cases where behavior is different depending on each attribute value (for example, as the attribute values of the affiliation, an accounting department, a general affairs department, a sales department, and the like). In the technique of Non-Patent Literature 1, since the normal model is generated based on the tendency in the normal data, normal behavior unique to each attribute value is not directly reflected on the normal model.

Therefore, there is a problem that the anomaly detection with high accuracy cannot be performed even if the normal model generated by the technique of Non-Patent Literature 1 is used.

The present disclosure mainly aims to solve such a problem. More specifically, the present disclosure mainly aims to enable highly-accurate anomaly detection.

Solution to Problem

A model generation apparatus according to the present disclosure includes:
an attribute-value extraction unit to extract as a plurality of model-generation attribute values, a plurality of attribute values belonging to an attribute associated with a monitoring subject for anomaly detection;
a division-data generation unit to extract for each model-generation attribute value, a normal event associated with the model-generation attribute value from normal data indicating a plurality of normal events each of which is found out to be normal, each of which is associated with one attribute value of the plurality of attribute values, and each of which includes a plurality of characteristics, and generate for each model-generation attribute value, division data indicating the extracted normal event;
a characteristic selection unit to select a combination of characteristics to be used for generation of a normal model to be used for anomaly detection, from a plurality of characteristics included in a plurality of normal events indicated in a plurality of pieces of division data generated for the plurality of model-generation attribute values; and a normal-model generation unit to generate the normal model for each model-generation attribute value, using the combination of characteristics selected by the characteristic selection unit.

Advantageous Effects of Invention

According to the present disclosure, since a normal model is generated for each model-generation attribute value, highly-accurate anomaly detection is possible.

BRIEF DESCRIPTION OF DRAWINGS

FIG. 6 is a diagram illustrating an example of normal data and log data according to the first embodiment.

FIG. 7 is a diagram illustrating an example of an attribute DB according to the first embodiment.

FIG. 8 is a diagram illustrating an example of a characteristic DB according to the first embodiment.

FIG. 9 is a diagram illustrating an example of a model characteristic DB according to the first embodiment.

FIG. 10 is a diagram illustrating an example of a normal-model management DB according to the first embodiment.

FIG. 11 is a diagram illustrating an example of a monitoring-subject management DB according to the first embodiment.

FIG. 12 is a diagram illustrating an outline of operation of the model-generation apparatus according to the first embodiment.

FIG. 22 is a flowchart illustrating an operation example of the anomaly detection apparatus according to the second embodiment.

DESCRIPTION OF EMBODIMENTS

Figure 1:
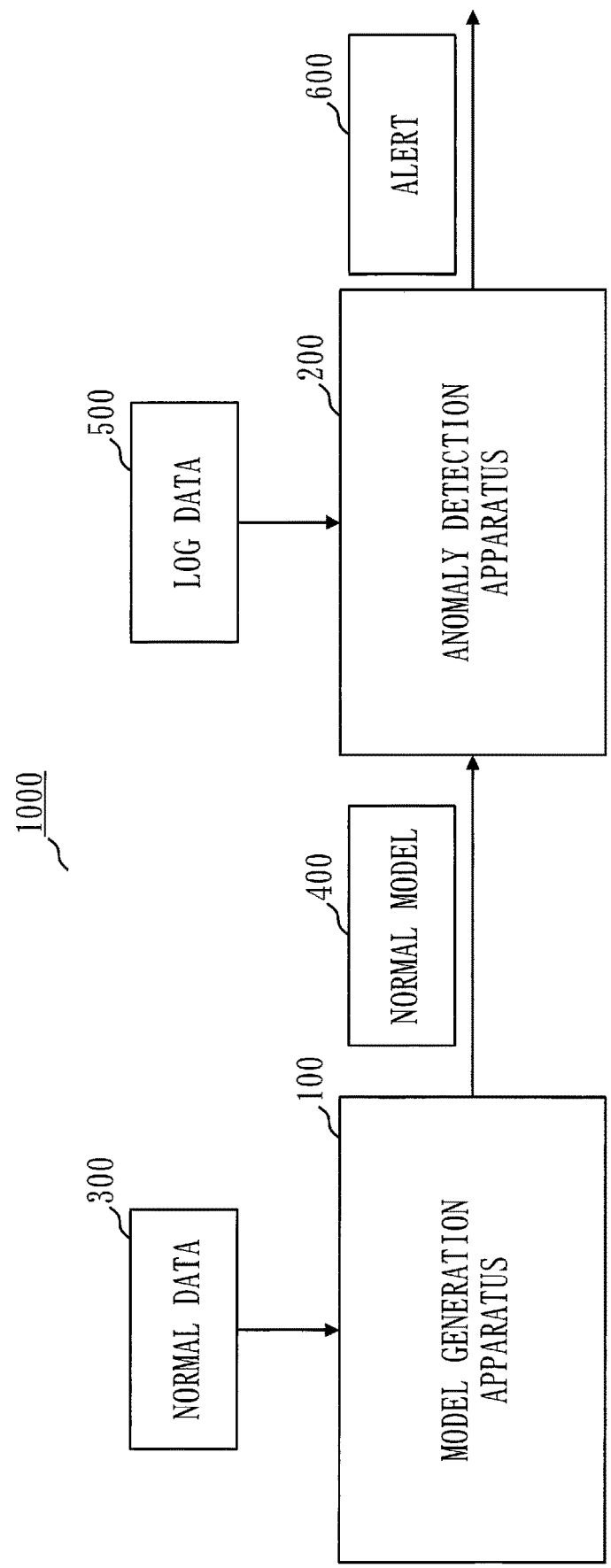
FIG. 1 is a diagram illustrating a configuration example of an anomaly detection system according to a first embodiment.

Hereinafter, embodiments will be described with reference to the drawings. In the following description of the embodiments and the drawings, parts assigned by the same reference numerals indicate the same parts or corresponding parts.

First Embodiment

Description of Configuration

FIG. 1 illustrates a configuration example of an anomaly detection system 1000 according to the present embodiment.

As illustrated in FIG. 1, the anomaly detection system 1000 is configured with a model generation apparatus 100 and an anomaly detection apparatus 200.

The model generation apparatus 100 acquires normal data 300, and generates a normal model 400 used for anomaly detection, based on the normal data 300. The normal model 400 is a model which expresses consistent behavior in the normal data.

The model generation apparatus 100 is a computer. An operation procedure of the model generation apparatus 100 is equivalent to a model generation method. Also, a program which realizes operation of the model generation apparatus 100 is equivalent to a model generation program.

The anomaly detection apparatus 200 acquires the normal model 400 generated by the model generation apparatus 100, and also acquires log data 500. The log data 500 is an example of monitoring data monitored by the anomaly detection apparatus 200. The anomaly detection apparatus 200 can monitor as the monitoring data, data other than the log data 500. In the present embodiment, the anomaly detection apparatus 200 acquires the log data 500 as the monitoring data.

Then, the anomaly detection apparatus 200 performs the anomaly detection, applying the normal model 400 to the acquired log data 500. As a result of the anomaly detection, when abnormal behavior (anomaly) is detected, the anomaly detection apparatus 200 outputs an alert 600.

The anomaly detection apparatus 200 is also a computer. An operation procedure of the anomaly detection apparatus 200 is equivalent to an anomaly detection method. Also, a program which realizes operation of the anomaly detection apparatus 200 is equivalent to an anomaly detection program.

The model generation apparatus 100 transmits the normal model 400 to the anomaly detection apparatus 200, for example, via wired communication or wireless communication, to convey the normal model 400 to the anomaly detection apparatus 200. Alternatively, the normal model 400 may be stored in a portable recording medium, the portable recording medium may be connected to the anomaly detection apparatus 200, and the anomaly detection apparatus 200 may read the normal model 400 from the portable recording medium. Alternatively, the normal model 400 may be sent from the model generation apparatus 100 to the anomaly detection apparatus 200 in methods other than these methods.

In the present embodiment, an example will be described in which the model generation apparatus 100 and the anomaly detection apparatus 200 are configured on respective different computers. Alternatively, the model generation apparatus 100 and the anomaly detection apparatus 200 may be configured on a computer.

Figure 2:
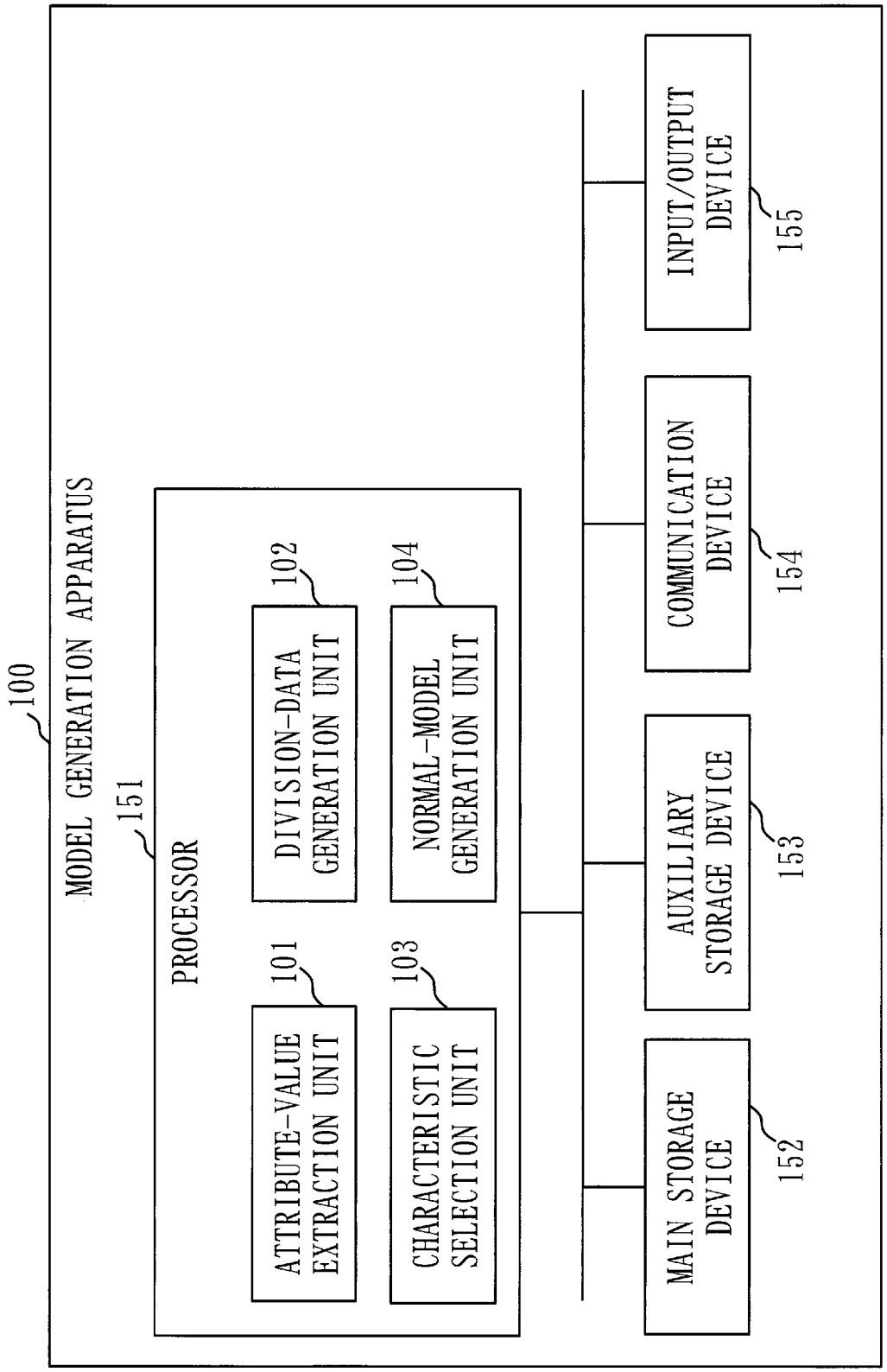
FIG. 2 is a diagram illustrating a hardware configuration example of a model generation apparatus according to the first embodiment.

FIG. 2 illustrates a hardware configuration example of the model generation apparatus 100.

The model generation apparatus 100 includes a processor 151, a main storage device 152, an auxiliary storage device 153, a communication device 154, and an input/output device 155 as pieces of hardware.

The auxiliary storage device 153 stores programs which realize functions of an attribute-value extraction unit 101, a division-data generation unit 102, a characteristic selection unit 103, and a normal-model generation unit 104 which will be described later.

These programs are loaded from the auxiliary storage device 153 into the main storage device 152. Then, the processor 151 executes these programs, and performs operation of the attribute-value extraction unit 101, the division-data generation unit 102, the characteristic selection unit 103, and the normal-model generation unit 104 which will be described later.

FIG. 2 schematically illustrates a state where the processor 151 executes the programs which realize the functions of the attribute-value extraction unit 101, the division-data generation unit 102, the characteristic selection unit 103, and the normal-model generation unit 104.

Figure 3:
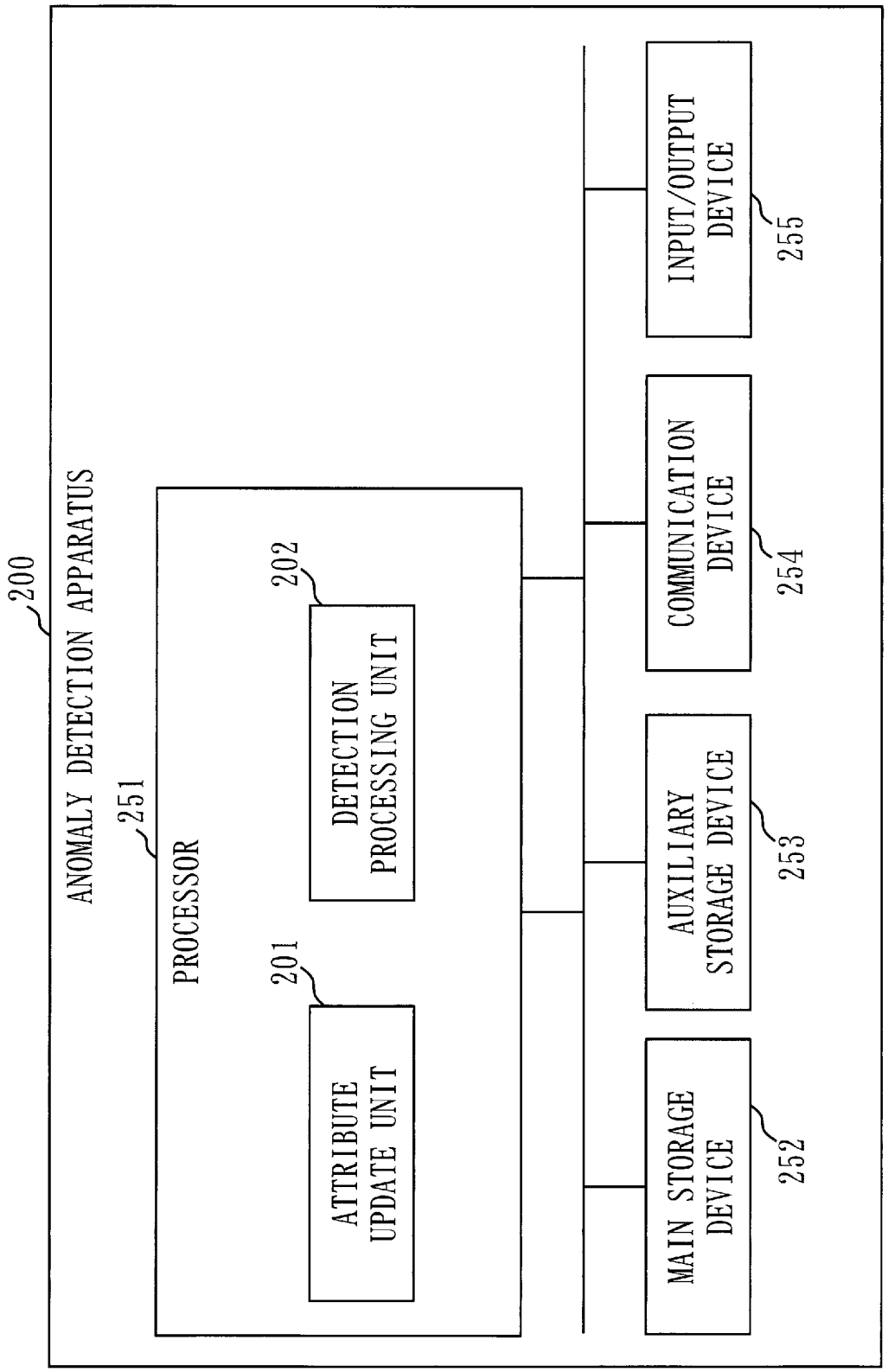
FIG. 3 is a diagram illustrating a hardware configuration example of an anomaly detection apparatus according to the first embodiment.

FIG. 3 illustrates a hardware configuration example of the anomaly detection apparatus 200.

The anomaly detection apparatus 200 includes a processor 251, a main storage device 252, an auxiliary storage device 253, a communication device 254, and an input/output device 255 as pieces of hardware.

The auxiliary storage device 253 stores programs which realize functions of an attribute update unit 201 and a detection processing unit 202 which will be described later.

These programs are loaded from the auxiliary storage device 253 into the main storage device 252. Then, the processor 251 executes these programs, and performs operation of the attribute update unit 201 and the detection processing unit 202 which will be described later.

FIG. 3 schematically illustrates a state where the processor 251 executes the programs which realize the functions of the attribute update unit 201 and the detection processing unit 202.

Figure 4:
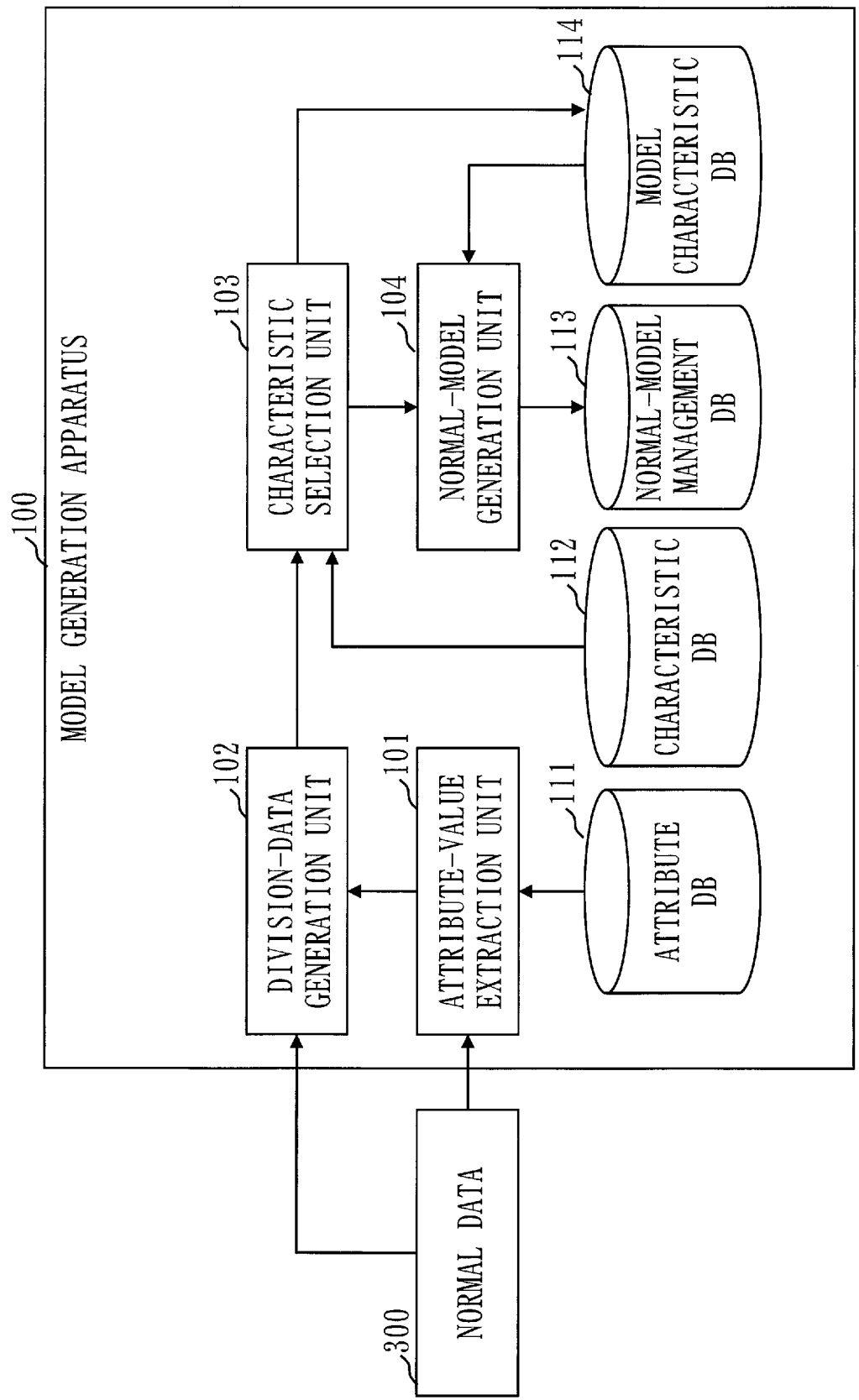
FIG. 4 is a diagram illustrating a functional configuration example of the model generation apparatus according to the first embodiment.

FIG. 4 illustrates a functional configuration example of the model generation apparatus 100 according to the present embodiment.

The attribute-value extraction unit 101 refers to an attribute DB 111 and extracts as a plurality of model-generation attribute values, a plurality of attribute values belonging to an attribute associated with a monitoring subject for the anomaly detection.

The attribute DB 111 indicates a plurality of attributes associated with the monitoring subject for the anomaly detection. The monitoring subject for the anomaly detection is a monitoring subject indicated in a monitoring-subject management DB 211 which will be described later. The monitoring subjects are, for example, a user account, an IP address, and a network address. The attribute DB 111 indicates the plurality of attributes associated with the monitoring subject indicated in the monitoring-subject management DB 211. Further, each attribute includes the plurality of attribute values. The attribute is department (hereinafter, simply referred to as an affiliation) to which an employee of a company belongs, a post of the employee, and the like. Further, as the attribute values included in the affiliation, there are, for example, an accounting department, a general affairs department, a sales department, and the like. Also, as attribute values included in the post, there are a president, an executive officer, a department manager, and the like.

The attribute DB 111 indicates a method of extracting the attribute values in each attribute from the normal data 300. The attribute-value extraction unit 101 extracts as the model-generation attribute values, according to the extraction method indicated in the attribute DB 111, the attribute values belonging to the attribute associated with the monitoring subject for the anomaly detection, referring to the normal data 300, directory information, and the like. Then, the attribute-value extraction unit 101 outputs the model-generation attribute values to the division-data generation unit 102.

Note that, a process performed by the attribute-value extraction unit 101 is equivalent to an attribute-value extraction process.

The division-data generation unit 102 acquires the normal data 300. Further, the division-data generation unit 102 acquires the model-generation attribute values from the attribute-value extraction unit 101.

Then, the division-data generation unit 102 divides the normal data 300 by each model-generation attribute value, and generates division data for each model-generation attribute value.

FIG. 6 illustrates an example of the normal data 300. The normal data 300 is time-series data such as log data, communication packet data, or sensor data. The normal data 300 indicates a plurality of normal events. The normal event is an event which has been found out to be normal, regarding data processing. The normal data 300 includes only the normal events. In the present embodiment, the normal data 300 is assumed to be communication log data.

The normal data 300 is configured with, for example, an IP address, a time stamp, a URL, a domain, size, a status code, and the like. Each of these, the IP address, the time stamp, the URL, the domain, the size, and the status code correspond to a characteristic. Further, respective concrete values (IP1, T1, URL1, domain 1, size 1, status 1, and the like) of the IP address, the time stamp, the URL, the domain, the size, and the status code are characteristic values. A set of characteristic values in each record in the normal data 300 corresponds to the event. For example, a record on the first line in FIG. 6 indicates an event that there has been an access to URL 1 from IP1 belonging to domain 1 at a time point T1, size of a packet used for the access is size 1, and a status generated at a time of the access is status 1. Further, behavior of a specific object (for example, a user corresponding to IP1) can be acquired by connecting the events in time-series order.

The division-data generation unit 102 extracts from the normal data 300, the normal events (records) associated with the model-generation attribute values acquired from the attribute-value extraction unit 101, and generates the division data indicating the extracted normal events for each model-generation attribute value. That is, the division-data generation unit 102 extracts records corresponding to the model-generation attribute value (for example, "accounting department") from the normal data 300, collects the extracted records corresponding to the "accounting department", and generates the division data corresponding to the "accounting department".

The division-data generation unit 102 outputs to the characteristic selection unit 103, a plurality of pieces of division data generated for the plurality of model-generation attribute values.

A process performed by the division-data generation unit 102 is equivalent to a division-data generation process.

The characteristic selection unit 103 divides by each concrete value of the monitoring subject, the plurality of pieces of division data generated by the division-data generation unit 102 for the plurality of model-generation attribute values. Then, the characteristic selection unit 103 refers to a characteristic DB 112 and selects from the division data for each concrete value of the monitoring subject, a combination of characteristics used for generation of the normal model 400. The plurality of pieces of division data indicate a plurality of normal events, and the plurality of normal events include a plurality of characteristics. The characteristic selection unit 103 selects from the plurality of characteristics in the plurality of pieces of division data, the combination of characteristics used for the generation of the normal model 400.

More specifically, the characteristic selection unit 103 generates a plurality of combinations of characteristics by combining the plurality of characteristics in the plurality of pieces of division data. Further, the characteristic selection unit 103 calculates for each generated combination of characteristics, classification accuracy which is accuracy in classifying the plurality of pieces of division data. Then, the characteristic selection unit 103 selects the combination of characteristics used for the generation of the normal model 400 based on the calculated classification accuracy.

The division data from which the combination of characteristics is selected by the characteristic selection unit 103 is also referred to as consistency-confirmed division data.

A process performed by the characteristic selection unit 103 is equivalent to a characteristic selection process.

The normal-model generation unit 104 generates the normal model 400 for each model-generation attribute value, using the combination of characteristics selected by the characteristic selection unit 103.

The normal-model generation unit 104 generates for each model-generation attribute value, the normal model 400, using the concrete values (characteristic values) corresponding to the combination of characteristics selected by the characteristic selection unit 103, indicated in the division data. More specifically, as with the characteristic selection unit 103, the normal-model generation unit 104 divides the division data by each concrete value of the monitoring subject, extracts the concrete values (characteristic values) from the division data for each monitoring subject, and generates the normal model 400.

The normal-model generation unit 104 generates the normal model 400, using a machine learning algorithm such as One-class Support Vector Machine.

A process performed by the normal-model generation unit 104 is equivalent to a normal-model generation process.

As described above, the attribute DB 111 indicates the plurality of attributes associated with the monitoring subject for the anomaly detection. Further, the attribute DB 111 indicates the method of extracting the attribute values belonging to each attribute.

Details of the attribute DB 111 will be described later.

The characteristic DB 112 indicates a plurality of characteristics, and a method of extracting each characteristic.

Details of the characteristic DB 112 will be described later.

A normal-model management DB 113 manages the normal models generated by the normal-model generation unit 104.

Details of the normal-model management DB 113 will be described later.

A model characteristic DB 114 indicates for each attribute, the selected combination of characteristics and a discriminator generated at a time of selecting the combination of characteristics.

Details of the model characteristic DB 114 will be described later.

Figure 5:
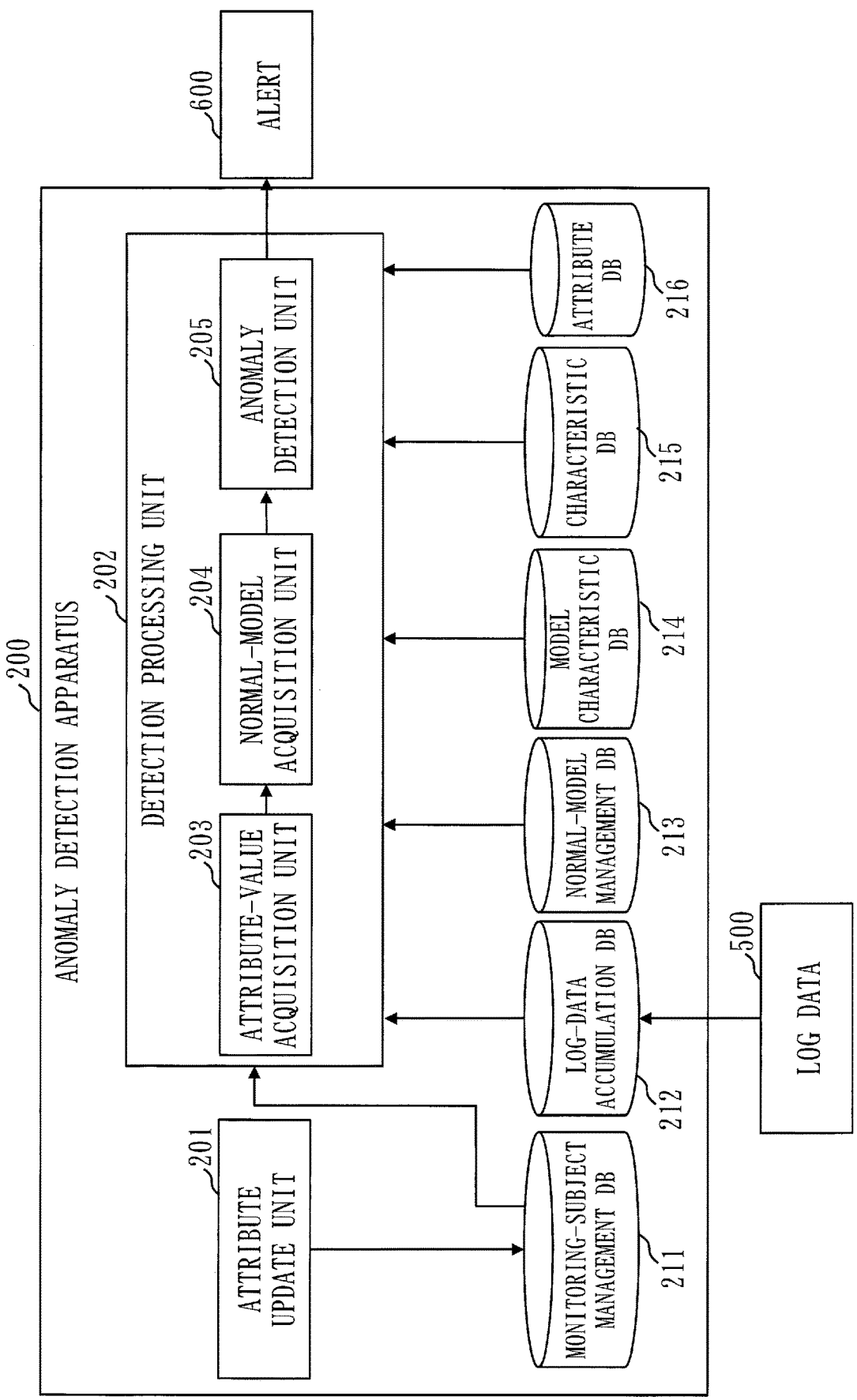
FIG. 5 is a diagram illustrating a functional configuration example of the anomaly detection apparatus according to the first embodiment.

FIG. 5 illustrates a functional configuration example of the anomaly detection apparatus 200 according to the present embodiment.

The attribute update unit 201 updates the attribute values indicated in the monitoring-subject management DB 211. More specifically, the attribute update unit 201 checks directory information, information on an authentication server, and the like periodically (for example, once a day). For example, the attribute update unit 201 crawls in an intranet, and checks the directory information, the information on the authentication server, and the like. Then, the attribute update unit 201 collects pieces of information such as an IP address, a user account which uses the IP address, an affiliation of the user, and a post of the user, and updates the attribute values indicated in the monitoring-subject management DB 211.

The detection processing unit 202 generates pieces of division data by dividing the log data 500. Further, the detection processing unit 202 acquires the normal models corresponding the generated pieces of division data, and performs the anomaly detection, using the normal models.

The detection processing unit 202 is configured with an attribute-value acquisition unit 203, a normal-model acquisition unit 204, and an anomaly detection unit 205.

The attribute-value acquisition unit 203 acquires the attribute values of the attribute associated with the monitoring subject for the anomaly detection.

More specifically, the attribute-value acquisition unit 203 acquires from the monitoring-subject management DB 211, the attribute values of the attribute associated with the monitoring subject. The monitoring subject is, for example, a user account, an IP address, or a network address. Note that, if the attribute values of the attribute associated with the monitoring subject have been changed, the attribute-value acquisition unit 203 acquires a before-change attribute value which is an attribute value before the change and an after-change attribute value which is an attribute value after the change.

Further, the attribute-value acquisition unit 203 generates the pieces of division data by dividing the log data 500 by each concrete value of the monitoring subject.

As with the normal data 300, the log data 500 is, for example, time-series data of a form illustrated in FIG. 6. The normal data 300 includes only the normal events, otherwise, most of the events are the normal events, and very few abnormal events are included. The events indicated in the log data 500 are not necessarily the normal events.

A process performed by the attribute-value acquisition unit 203 is equivalent to an attribute-value acquisition process.

The normal-model acquisition unit 204 acquires the attribute value from the attribute-value acquisition unit 203. Then, the normal-model acquisition unit 204 refers to a normal-model management DB 213, and acquires the normal model corresponding to the attribute value acquired from the attribute-value acquisition unit 203, in other words, the normal model corresponding to the attribute value acquired by the attribute-value acquisition unit 203.

As described later, the normal-model management DB 213 manages the plurality of normal models generated corresponding to the plurality of attributes. The normal-model acquisition unit 204 acquires from among the plurality of normal models generated corresponding to the plurality of attributes, the normal model generated corresponding to the attribute value acquired from the attribute-value acquisition unit 203.

Note that, when the before-change attribute value and the after-change attribute value are acquired from the attribute-value acquisition unit 203, the normal-model acquisition unit 204 acquires a normal model corresponding to the before-change attribute value and a normal model corresponding to the after-change attribute value.

The normal-model acquisition unit 204 outputs the normal model to the anomaly detection unit 205.

A process performed by the normal-model acquisition unit 204 is equivalent to a normal-model acquisition process.

The anomaly detection unit 205 performs the anomaly detection by applying the normal model acquired from the normal-model acquisition unit 204 to the division data acquired from the attribute-value acquisition unit 203.

If the division data of the before-change attribute value and the division data of the after-change attribute value are acquired from the attribute-value acquisition unit 203, and the normal model corresponding to the before-change attribute value and the normal model corresponding to the after-change attribute value are acquired from the normal-model acquisition unit 204, the anomaly detection unit 205 performs the anomaly detection, by applying to the division data of the before-change attribute value, the normal model corresponding to the division data of the before-change attribute value and applying to the division data of the after-change attribute value, the normal model corresponding to the division data of the after-change attribute value.

Then, the anomaly detection unit 205 outputs the alert 600 if the anomaly is detected.

A process performed by the anomaly detection unit 205 is equivalent to an anomaly detection process.

The monitoring-subject management DB 211 indicates the attribute values of each of the plurality of attributes for each monitoring subject. As described above, if the attribute value has been changed, the monitoring-subject management DB 211 indicates the before-change attribute value and the after-change attribute value. Note that, the before-change attribute value may be deleted after a predetermine period of time (for example, a month) has passed since the change of the attribute value.

Details of the monitoring-subject management DB 211 will be described later.

A log-data accumulation DB 212 accumulates the log data 500 at intervals of a predetermined period of time (for example, 5 minutes).

The normal-model management DB 213 manages the plurality of normal models. The normal-model management DB 213 is the same as the normal-model management DB 113 illustrated in FIG. 4.

A model characteristic DB 214 indicates for each attribute, the plurality of characteristics included in the normal model and the normal data from which each characteristic has been extracted. The model characteristic DB 214 is the same as the model characteristic DB 114 illustrated in FIG. 4.

A characteristic DB 215 indicates the plurality of characteristics, and the method of extracting each characteristic. The characteristic DB 215 is the same as the characteristic DB 112 illustrated in FIG. 4.

An attribute DB 216 indicates the plurality of attributes associated with the monitoring subject for the anomaly detection. Further, the attribute DB 216 indicates the method of extracting the attribute values belonging to each attribute. The attribute DB 216 is the same as the attribute DB 111 illustrated in FIG. 3.

FIG. 7 illustrates an example of the attribute DB 111 and the attribute DB 216. As illustrated in FIG. 7, the attribute DB 111 and the attribute DB 216 are configured with columns of an attribute, a reference item, an extraction method, and a hierarchical structure.

The column of the attribute indicates the plurality of attributes associated with the monitoring subject indicated in the monitoring-subject management DB 211. In other words, the column of the attribute indicates the attributes to which the attribute values extracted by the attribute-value extraction unit 101 as the model-generation attribute values belong.

The column of the reference item indicates items in the pieces of division data which should be referred to when the attribute-value extraction unit 101 extracts the model-generation attribute values. For example, when the attribute-value extraction unit 101 extracts the attribute values belonging to the attribute "affiliation" as the model-generation attribute values, it is necessary to refer to items of a user account in the pieces of division data.

The column of the extraction method indicates a method of generating the model-generation attribute values based on the pieces of division data. FIG. 7 describes specific extraction methods of the attribute values for easy understanding, however, in actual operation, it is assumed that the column of the extraction method describes paths to script files describing the extraction methods.

The column of the hierarchical structure indicates whether or not the attribute value has a hierarchical structure. For example, there is no hierarchical structure between the accounting department, the general affairs department, and the sales department which are the attribute values of the attribute "affiliation". On the other hand, there is a hierarchical structure between a president, an executive officer, a department manager, and the like which are the attribute values of the attribute "post."

FIG. 8 illustrates an example of the characteristic DB 112 and the characteristic DB 215. As illustrated in FIG. 8, the characteristic DB 112 and the characteristic DB 215 are configured with columns of a characteristic, a type of a log, and an extraction method.

The column of the characteristic indicates the characteristics extracted from the normal data 300 or the log data 500.

The column of the type of the log indicates a type of the normal data 300 or the log data 500 from which the characteristic is extracted.

The column of the extraction method indicates a method of generating the characteristics from the normal data 300 or the log data 500. FIG. 8 describes specific extraction methods of the characteristics for easy understanding, however, in actual operation, it is assumed that the column of the extraction method describes paths to script files describing the extraction methods.

FIG. 9 illustrates an example of the model characteristic DB 114 and the model characteristic DB 214. As illustrated in FIG. 9, the model characteristic DB 114 and the model characteristic DB 214 are configured with columns of an attribute, a combination of characteristics, and a discriminator.

The column of the attribute indicates the attributes for which the combinations of characteristics have been selected. In other words, the column of the attribute indicates the consistency-confirmed attributes.

The column of the combination of characteristics indicates for each type of log data, the combination of characteristics included in the normal model 400. In other words, the column of the combination of characteristics indicates for each type of log data, the combination of characteristics selected by the characteristic selection unit 103. For example, in an attribute "affiliation", for each attribute value (the accounting department, the general affairs, the sales department, or the like) belonging to the affiliation, the normal model corresponding to a proxy log, the normal model corresponding to a file server log, and the normal model corresponding to an authentication server log are generated. Then, the normal model corresponding to the proxy log includes characteristics such as access intervals, an access time range, an access domain, and response size which are described in parentheses. Similarly, the normal model corresponding to the file server log and the normal model corresponding to the authentication server log include the characteristics in parentheses.

The column of the discriminator indicates a discriminator generated when the combinations of characteristics indicated in the column of the combination of characteristics are selected.

FIG. 10 illustrates an example of the normal-model management DB 113 and the normal-model management DB 213. As illustrated in FIG. 10, the normal-model management DB 113 and the normal-model management DB 213 indicate a column of an attribute, a column of an attribute value, and a column of a normal model.

The column of the attribute indicates attributes for which the normal models have been generated.

The column of the attribute value indicates the plurality of attribute values belonging to the attributes.

The column of the normal model indicates paths to areas where the normal models are stored.

FIG. 11 illustrates an example of the monitoring-subject management DB 211. As illustrated in FIG. 11, the monitoring-subject management DB 211 indicates columns of a monitoring subject and a plurality of attributes.

The monitoring subject is the monitoring subject for the anomaly detection. An example of FIG. 11 indicates an example in which the monitoring subject is an IP address. Note that, below, an IP address "192.168.1.5" indicated in FIG. 11 is also referred to as "IP1.5". Similarly, an IP address "192.168.1.6" indicated in FIG. 11 is also referred to as "IP1.6". Also, specific IP addresses such as "IP1.5" and "IP1.6" are the concrete values of the monitoring subject: IP address.

The attributes are the attributes associated with the monitoring subjects for the anomaly detection. In an example of FIG. 11, attributes 1 to n are the attributes associated with the monitoring subjects. Further, for example, when an affiliation or/and a post of an employee is/are changed due to a personnel change, the monitoring-subject management DB 211 indicates the before-change attribute value which is the attribute value before the change and the after-change attribute value which is the attribute value after the change.

The column of each attribute indicates, as for the before-change attribute values, the before-change attribute values (for example, "general affairs department"), paths to the normal models, and a time point to start the before-change attribute values. On the other hand, the column of each attribute indicates, as for the after-change attribute values, the after-change attribute values (for example, "human resources department"), paths to the normal models, a time point to start the after-change attribute values, flags indicating "in operation" or "out of operation", and weight.

Description of Operation

Next, with reference to FIG. 12, an outline of the operation of the model generation apparatus 100 according to the present embodiment will be described.

The attribute-value extraction unit 101, according to the extraction method of the attribute values indicated in the attribute DB 111, refers to the normal data 300, the directory information, and the like, and extracts as the model-generation attribute values, the attribute values belonging to the attributes associated with the monitoring subject for the anomaly detection. The attribute-value extraction unit 101 outputs the extracted model-generation attribute values to the division-data generation unit 102.

Further, the division-data generation unit 102 acquires the normal data 300, divides the normal data 300 by each model-generation attribute value, and generates the division data for each model-generation attribute value.

In an example of FIG. 12, the division-data generation unit 102 generates the division data for each model-generation attribute value belonging to the attribute "affiliation", and generates the division data for each model-generation attribute value belonging to the attribute "post". That is, for the attribute "affiliation", the division-data generation unit 102 extracts records of employees belonging to the human resources department from the normal data 300, and generates the division data of the human resources department. Similarly, also for the general affairs department, the sales department, and the like, the division-data generation unit 102 generates the pieces of division data. Also for the attribute "post", the division-data generation unit 102 extracts records of a president from the normal data 300, and generates the division data of the president. Similarly, also for an executive officer, a director, a department manager, and the like, the division-data generation unit 102 generates the pieces of division data.

Next, the characteristic selection unit 103 analyzes the division data for each attribute, and selects the combination of characteristics.

Specifically, the characteristic selection unit 103 divides the division data into learning data and verification data. The learning data is learning-purpose division data. The verification data is verification-purpose division data.

Further, the characteristic selection unit 103 generates a plurality of combinations of characteristics included in the pieces of learning data, referring to the characteristic DB 112.

Here, an example will be described of generating the combinations of characteristics based on the learning data of the attribute "affiliation". Note that, "IP1.7" indicated below is "192.168.1.7". Similarly, "IP1.9" is "192.168.1.9". "IP1.10" is "192.168.1.10". "IP1.11" is "192.168.1.11".

As pieces of learning data for "human resources department", it is assumed that there are, for example, a plurality of pieces of learning data including "IP1.5", a plurality of pieces of learning data including "IP1.6", and a plurality of pieces of learning data including "IP1.7".

Further, as pieces of learning data for "sales department", it is assumed that there are, for example, a plurality of pieces of learning data including "IP1.9" and a plurality of pieces of learning data including "IP1.10".

As pieces of learning data for "general affairs department", it is assumed that there are, for example, a plurality of pieces of learning data including "IP1.11".

The characteristic selection unit 103 extracts a plurality of characteristic vectors of "IP1.5", a plurality of characteristic vectors of "IP1.6", and a plurality of characteristic vectors of "IP1.7" from the pieces of learning data for the "human resources department".

Further, the characteristic selection unit 103 extracts a plurality of characteristic vectors of "IP1.9" and a plurality of characteristic vectors of "IP1.10" from the pieces of learning data for the "sales department".

Further, the characteristic selection unit 103 extracts a plurality of characteristic vectors of "IP1.11" from the pieces of learning data for the "general affairs department".

For all of pieces of learning data for the "human resources department", the "sales department", and the "general affairs department", the extracted combinations of characteristics are the same.

Next, for each attribute, the characteristic selection unit 103 performs learning with the usage of the learning data as teacher data, and generates the discriminators based on the combinations of characteristics. The characteristic selection unit 103 generates the discriminators, using an algorithm such as a random forest, for example. Then, the characteristic selection unit 103 calculates the classification accuracy of the generated discriminators with respect to pieces of verification data.

The characteristic selection unit 103 evaluates the classification accuracy, using as pieces of teacher data, a set of characteristic vectors of the "human resources department", a set of characteristic vectors of the "sales department", and a set of characteristic vectors of the "general affairs department".

If the pieces of learning data of the attribute "affiliation" are taken as examples for explanation, the characteristic selection unit 103 generates the discriminator for each combination of characteristics generated from the pieces of learning data of the attribute "affiliation". Here, it is assumed that the characteristic selection unit 103 has generated a combination A of characteristics, a combination B of characteristics, and a combination C of characteristics. In this case, the characteristic selection unit 103 generates a discriminator A based on the combination A of characteristics, a discriminator B based on the combination B of characteristics, and a discriminator C based on the combination C of characteristics.

The characteristic selection unit 103 measures the classification accuracy of the discriminator A with respect to the pieces of verification data of the attribute "affiliation". That is, the characteristic selection unit 103 calculates the classification accuracy as to whether or not the discriminator A can correctly classify the verification data of the human resources department into the verification data of the human resources department, as to whether or not the discriminator A can correctly classify the verification data of the general affairs department into the verification data of the general affairs department, and as to whether or not the discriminator A can correctly classify the verification data of the sales department into the verification data of the sales department.

Similarly, the characteristic selection unit 103 calculates the classification accuracy of each of the discriminator B and the discriminator C.

Then, the characteristic selection unit 103 selects the discriminator with the highest classification accuracy which is equal to or larger than a threshold value. Here, it is assumed that the discriminator A has been selected. Further, the characteristic selection unit 103 selects as the combination of characteristics used for the generation of the normal model 400, the combination A of characteristics corresponding to the selected discriminator A. Note that, the characteristic selection unit 103 may select one or more characteristics whose degree of contribution to the classification accuracy is high, among the characteristics included in the combination A of characteristics, and select only the selected one or more characteristics as the combination of characteristics used for the generation of the normal model.

Next, the normal-model generation unit 104 generates the normal model 400 for each attribute value based on the division data and the combination of characteristics.

If the pieces of learning data of the attribute "affiliation" are taken as examples for explanation, the normal-model generation unit 104 generates the normal model (human resources department), using the concrete values (characteristic values) which are included in the division data (human resources department) of the characteristics included in the combination A of characteristics selected by the characteristic selection unit 103 for the attribute "affiliation". Similarly, the normal-model generation unit 104 generates the normal model (general affairs department), using the concrete values (characteristic values) which are included in the division data (general affairs department) of the characteristics included in the combination A of characteristics selected by the characteristic selection unit 103 for the attribute "affiliation".

Next, with reference to FIG. 13, an outline of the operation of the anomaly detection apparatus 200 according to the present embodiment will be described.

First, the attribute-value acquisition unit 203 acquires the log data 500 from the log-data accumulation DB 212. Further, the attribute-value acquisition unit 203 acquires the concrete values of the monitoring subject from the monitoring-subject management DB 211. Here, as indicated in FIG. 11, the monitoring subject is assumed to be an IP address. The attribute-value acquisition unit 203 acquires, for example, values such as "IP1.5" and "IP1.6" indicated in FIG. 11.

Further, for each concrete value of the monitoring subject, the attribute-value acquisition unit 203 divides the log data 500 and generates the division data. In an example of FIG. 13, the attribute-value acquisition unit 203 divides the log data 500 by each of "IP1.5", "IP1.6", and the like.

The normal-model acquisition unit 204 acquires from the normal-model management DB 213, the normal model 400 corresponding to the before-change attribute value of the concrete value (for example, "IP1.5") of the monitoring subject and the normal model 400 corresponding to the after-change attribute value of the concrete value of the monitoring subject. More specifically, the normal-model acquisition unit 204 acquires from the normal-model management DB 213, the normal models 400 corresponding to the before-change attribute values and the normal models 400 corresponding to the after-change attribute values, for example, for the attributes 1 to n in "IP1.5".

The anomaly detection unit 205 determines whether or not behavior indicated in the division data matches normal behavior indicated in the normal model 400, and calculates an abnormality degree. The abnormality degree indicates a degree of how much the behavior indicated in the division data deviates from the normal behavior.

Figure 13:
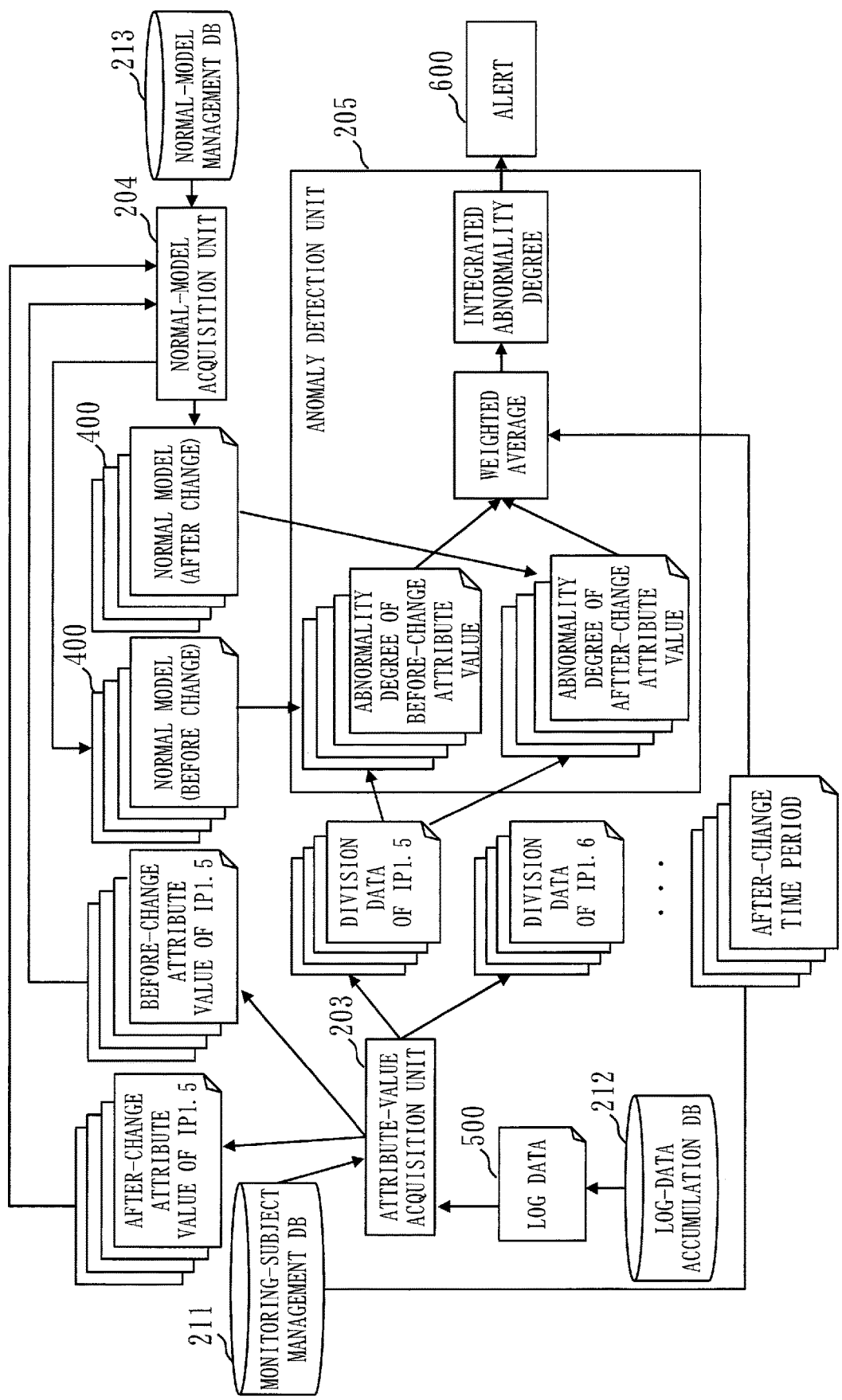
FIG. 13 is a diagram illustrating an outline of operation of the anomaly detection apparatus according to the first embodiment.

In an example of FIG. 13, the anomaly detection unit 205 determines whether or not the behavior indicated in the division data of "IP1.5" matches the normal behavior indicated in the normal model 400 corresponding to the before-change attribute value, and calculates the abnormality degree. Also, the anomaly detection unit 205 determines whether or not the behavior indicated in the division data of "IP1.5" matches the normal behavior indicated in the normal model 400 corresponding to the after-change attribute value, and calculates the abnormality degree.

Next, the anomaly detection unit 205 obtains for each attribute, a weighted average of the abnormality degree of the before-change attribute value and the abnormality degree of the after-change attribute value, using an after-change time period.

The after-change time period is a period of time from the time point to start the after-change attribute until the current time. The anomaly detection unit 205 obtains the after-change time period by referring to the time point to start the after-change attribute value described in the monitoring-subject management DB 211.

Note that, a method of weighted-average calculation will be described later.

Next, the anomaly detection unit 205 calculates an integrated abnormality degree by integrating the abnormality degrees after the weighted average of each attribute. That is, the anomaly detection unit 205 obtains the integrated abnormality degree by adding up the abnormality degrees after the weighted average of each of the attributes 1 to n for "IP1.5" in FIG. 11.

Then, if the integrated abnormality degree is equal to or larger than a threshold value, the anomaly detection unit 205 outputs the alert 600. For example, the anomaly detection unit 205 outputs the alert 600 to a display device which is a part of the input/output device 255.

Further, similarly, also for the other concrete values ("IP1.6" and the like) of the IP address, the anomaly detection unit 205 obtains the integrated abnormality degree by adding up the abnormality degrees after the weighted average of each of the attributes 1 to n. Also in this case, if the integrated abnormality degree is equal to or larger than the threshold value, the anomaly detection unit 205 outputs the alert 600.

Further, similarly, also for each concrete value of the other monitoring subjects (a user account, a network address, and the like), the anomaly detection unit 205 obtains the integrated abnormality degree. Also in this case, if the integrated abnormality degree is equal to or larger than the threshold value, the anomaly detection unit 205 outputs the alert 600.

Next, with reference to flowcharts, operation examples of the model generation apparatus 100 and the anomaly detection apparatus 200 according to the present embodiment will be described.

Figure 14:
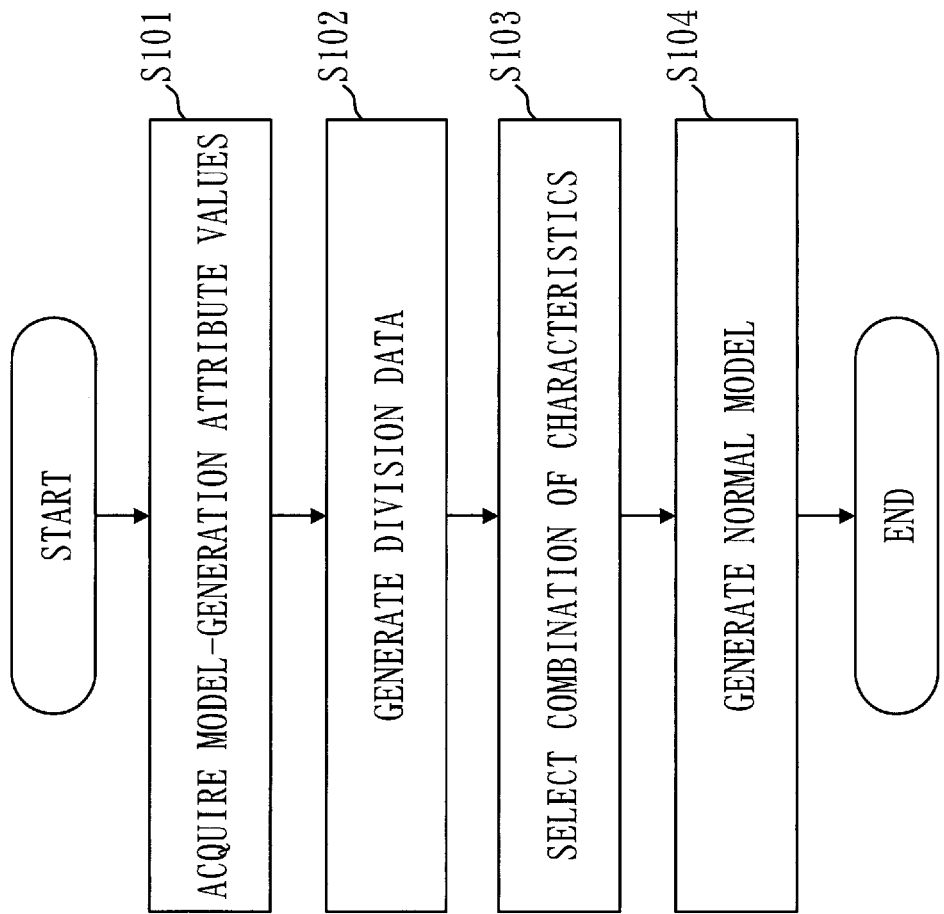
FIG. 14 is a flowchart illustrating an operation example of the model generation apparatus according to the first embodiment.

FIG. 14 illustrates the operation example of the model generation apparatus 100.

First, with reference to FIG. 14, the operation example of the model generation apparatus 100 will be described.

In step S101, the attribute-value extraction unit 101 extracts the model-generation attribute values from the attribute DB 111. The attribute-value extraction unit 101 outputs the extracted model-generation attribute values to the division-data generation unit 102.

Next, in step S102, the division-data generation unit 102 acquires the normal data 300, divides the normal data 300 by each model-generation attribute value, and generates the division data for each model-generation attribute value.

The division-data generation unit 102 outputs to the characteristic selection unit 103, the plurality of pieces of division data generated.

Next, in step S103, the characteristic selection unit 103 generates the plurality of combinations of characteristics by combining the plurality of characteristics included in the plurality of pieces of division data, and selects the combination of characteristics to be used for the generation of the normal model.

Next, in step S104, the normal-model generation unit 104 generates the normal model 400 for each model-generation attribute value based on the combination of characteristics selected by the characteristic selection unit 103.

Figure 15:
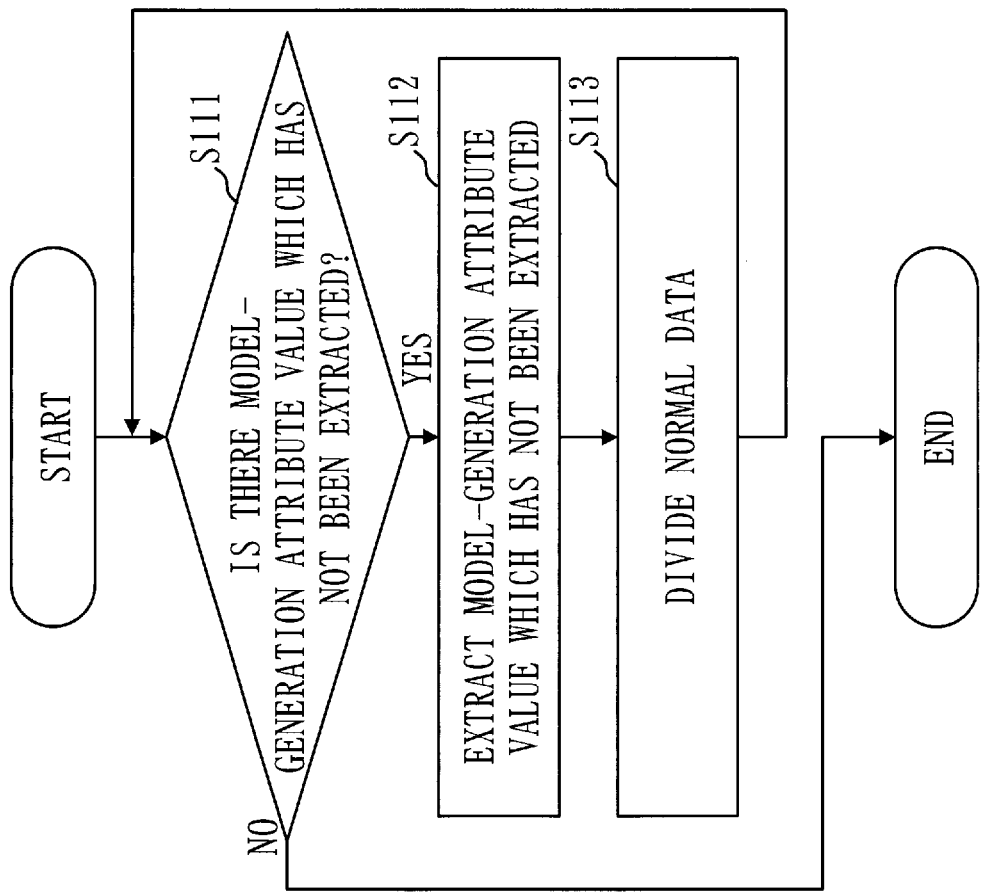
FIG. 15 is a flowchart illustrating a model-generation-attribute-value extraction process and a division-data generation process according to the first embodiment.

FIG. 15 illustrates details of a model-generation-attribute-value extraction process (step S101 in FIG. 14) and the division-data generation process (step S102 in FIG. 14).

First, in step S111, the attribute-value extraction unit 101 determines whether or not there is a model-generation attribute value which has not been extracted from the attribute DB 111.

If there is the model-generation attribute value which has not been extracted, the process proceeds to step S112. On the other hand, if there is no model-generation attribute value which has not been extracted, the process ends.

In step S112, the attribute-value extraction unit 101 extracts the model-generation attribute value which has not been extracted, according to the extraction method described in the attribute DB 111.

For example, if the model-generation attribute value included in the attribute "affiliation" is extracted, the attribute-value extraction unit 101 extracts a value of the user account from each record of the normal data 300 according to the descriptions of the attribute DB 111. Then, the attribute-value extraction unit 101 refers to the affiliation (for example, "accounting department") corresponding to the user account in in-house directory information, and specifies the affiliation of a corresponding employee.

Also, if the user account is not included in the normal data 300, the attribute-value extraction unit 101 specifies the user account from the IP address based on a log of an AD server. Thereafter, the attribute-value extraction unit 101 specifies the affiliation of the employee in the above-described method.

The attribute value (for example, "accounting department") indicating the affiliation of the employee specified in this way is equivalent to the model-generation attribute value.

Then, the attribute-value extraction unit 101 outputs the model-generation attribute value to the division-data generation unit 102.

In step S113, the division-data generation unit 102 divides the normal data 300 according to the model-generation attribute values.

More specifically, the division-data generation unit 102 extracts from the normal data 300, the normal events (records) associated with the model-generation attribute values, and generates for each model-generation attribute value, the division data indicating the extracted normal events. That is, the division-data generation unit 102 extracts the records corresponding to the model-generation attribute value (for example, "accounting department") from the normal data 300, collects the extracted records corresponding to the "accounting department", and generates the pieces of division data corresponding to the "accounting department".

Figure 16:
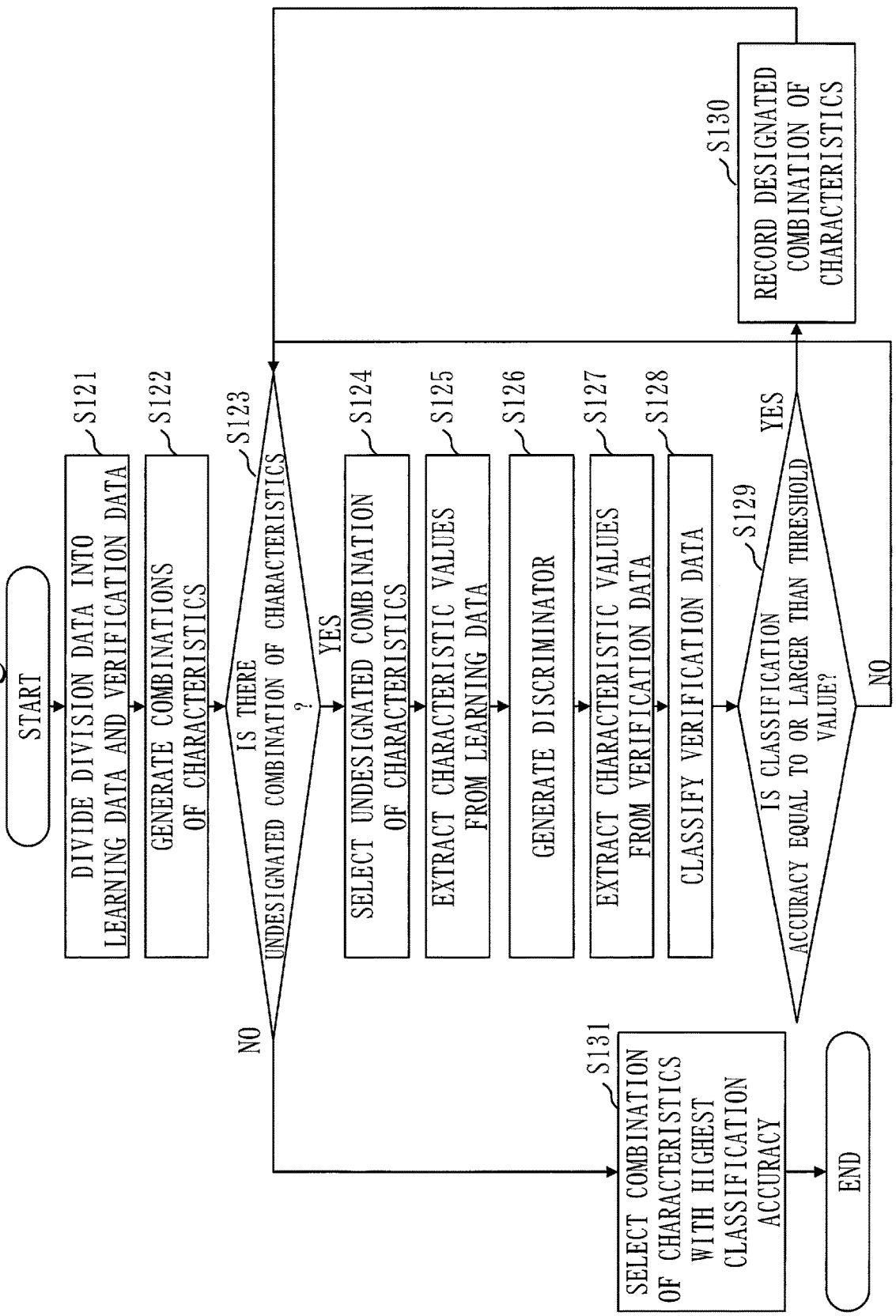
FIG. 16 is a flowchart illustrating a characteristic selection process according to the first embodiment.

FIG. 16 illustrates details of the characteristic selection process (S103 in FIG. 14).

In step S121, the characteristic selection unit 103 divides the division data into the learning data and the verification data. More specifically, the characteristic selection unit 103 divides the division data generated by the division-data generation unit 102 by each concrete value of the monitoring subject, and generates the division data for each concrete value of the monitoring subject. Then, the characteristic selection unit 103 divides into the learning data and the verification data, the generated division data for each concrete value of the monitoring subject. For example, the characteristic selection unit 103 designates as the learning data, division data which has old date, and designates as the verification data, division data which has new date.

Next, in step S122, the characteristic selection unit 103 refers to the characteristic DB 112, and generates the plurality of combinations of characteristics included in the learning data.

Next, in step S123, the characteristic selection unit 103 determines whether or not there is an undesignated combination of characteristics among the combinations of characteristics generated in step S122.

If there is the undesignated combination of characteristics, the process proceeds to step S124. On the other hand, if there is no undesignated combination of characteristics, the process proceeds to step S131.

In step S124, the characteristic selection unit 103 designates the undesignated combination of characteristics.

Next, in step S125, the characteristic selection unit 103 extracts from the learning data, the characteristic values of each characteristic in the combination of characteristics designated in step S124. Then, the characteristic selection unit 103 generates the characteristic vector based on the extracted characteristic values. Note that, the characteristic selection unit 103 generates the characteristic vector, after converting character-string data such as a URL and affiliation data such as a status code into expression such as a One-hot vector.

Next, in step S126, the characteristic selection unit 103 generates the discriminator based on the characteristic values extracted in step S125, using an existing machine learning algorithm. The characteristic selection unit 103 uses as the teacher data, the attribute values used for generation of the pieces of division data. Further, the characteristic selection unit 103 may perform a grid search for a parameter so as to obtain an optimum hyperparameter.

Next, in step S127, the characteristic selection unit 103 extracts from the verification data, the characteristic values of each characteristic in the combination of characteristics designated in step S124. Then, the characteristic selection unit 103 generates the characteristic vector based on the extracted characteristic values.

Next, in step S128, the characteristic selection unit 103 classifies the verification data, using the discriminator generated in step S127 and the characteristic vector extracted in step S128.

Next, in step S129, the characteristic selection unit 103 calculates the classification accuracy of the discriminator with respect to the verification data, and determines whether or not the classification accuracy is equal to or larger than a threshold value.

If the classification accuracy is equal to or larger than the threshold value, the process proceeds to step S130. On the other hand, if the classification accuracy is smaller than the threshold value, the process returns to step S123.

In step S130, the characteristic selection unit 103 records the combination of characteristics designated in step S125. After that, the process returns to step S123.

In a case of NO in step S123, that is, if the process of step S124 and the processes after step S124 have been performed on all of the combinations of characteristics, in step S131, the characteristic selection unit 103 selects the combination of characteristics with the highest classification accuracy.

If there exist a plurality of combinations of characteristics with the highest classification accuracy, the characteristic selection unit 103 selects a combination with the least number of characteristics.

Further, the characteristic selection unit 103 stores the selected combination of characteristics and the discriminator in the model characteristic DB 114.

Figure 17:
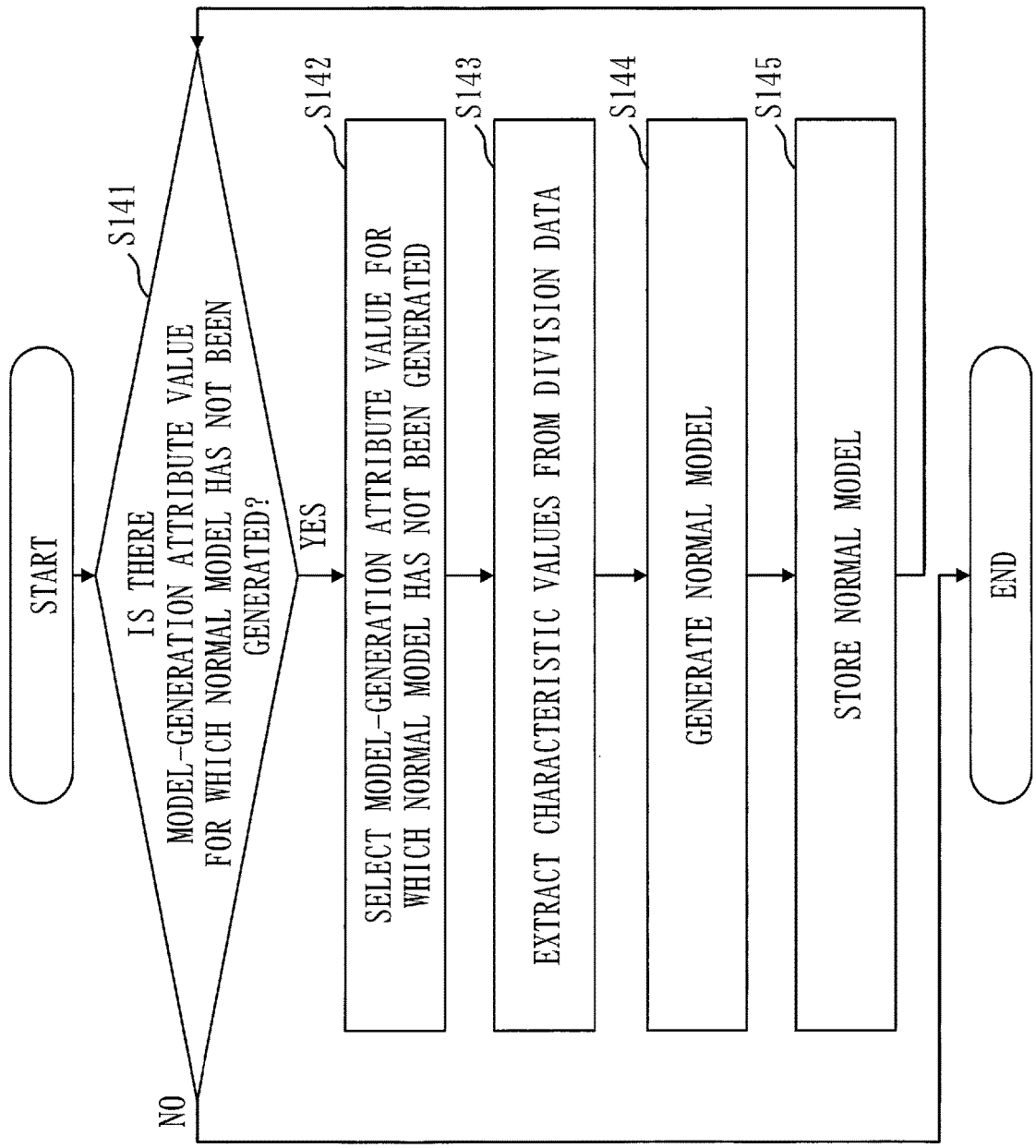
FIG. 17 is a flowchart illustrating a normal-model generation process according to the first embodiment.

FIG. 17 illustrates details of the normal-model generation process (step S104 in FIG. 14).

In step S141, the normal-model generation unit 104 determines whether or not there is a model-generation attribute value for which the normal model has not been generated.

If the normal models have been generated for all of the model-generation attribute values, the process ends.

On the other hand, if there is the model-generation attribute value for which the normal model has not been generated, the process proceeds to step S142.

In step S142, the normal-model generation unit 104 selects the model-generation attribute value for which the normal model 400 has not been generated.

Next, in step S143, the normal-model generation unit 104 extracts the characteristic values corresponding to the combination of characteristics from the division data corresponding to the model-generation attribute value selected in step S142.

More specifically, the normal-model generation unit 104 divides the division data generated by the division-data generation unit 102 by each concrete value of the monitoring subject, and generates the division data for each concrete value of the monitoring subject. Then, the normal-model generation unit 104 reads from the model characteristic DB 114, the combination of characteristics selected for the attribute to which the attribute value selected in step S142 belongs. Then, the normal-model generation unit 104 extracts the characteristic values corresponding to the read combination of characteristics from the division data for each concrete value of the monitoring subject, the division data corresponding to the attribute value selected in step S142.

Next, in step S144, the normal-model generation unit 104 generates the normal model 400, using the characteristic values extracted in step S143.

Next, in step S145, the normal-model generation unit 104 stores the generated normal model 400 in the normal-model management DB 113.

Thereafter, the process returns to step S141.

Note that, for any of the attributes, when the characteristic selection unit 103 does not select the combination of characteristics used for the generation of the normal model 400 since the classification accuracy for all of the combinations of characteristics does not satisfy the required accuracy, the normal-model generation unit 104 does not generate the normal model 400 for the attribute.

Figure 18:
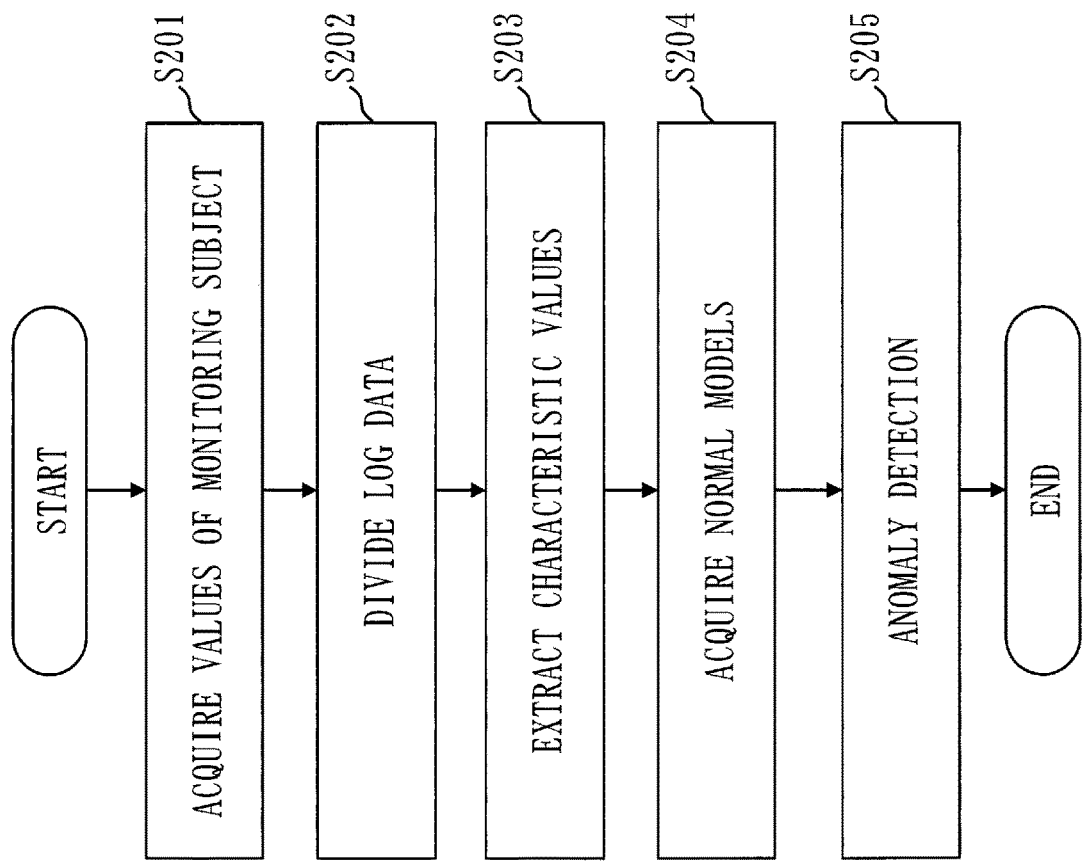
FIG. 18 is a flowchart illustrating an operation example of the anomaly detection apparatus according to the first embodiment.

FIG. 18 illustrates an operation example of the detection processing unit 202 of the anomaly detection apparatus 200.

With reference to FIG. 18, the operation example of the detection processing unit 202 will be described.

First, in step S201, the attribute-value acquisition unit 203 acquires the concrete values of the monitoring subject from the monitoring-subject management DB 211.

Next, in step S202, the attribute-value acquisition unit 203 divides the log data 500 in the log-data accumulation DB 212 by each concrete value of the monitoring-subject, and generates the pieces of division data.

Next, in step S203, the attribute-value acquisition unit 203 extracts from each piece of division data, the characteristic values corresponding to the attribute values associated with the concrete values of the monitoring subject, referring to the characteristic DB 215, and generates the characteristic vector based on the extracted characteristic values.

Next, in step S204, the normal-model acquisition unit 204 acquires from the normal-model management DB 213, the normal models 400 corresponding to the attribute values associated with the concrete values of the monitoring subject.

Next, in step S205, the anomaly detection unit 205 performs the anomaly detection for each piece of division data, using the normal model 400.

Figure 19:
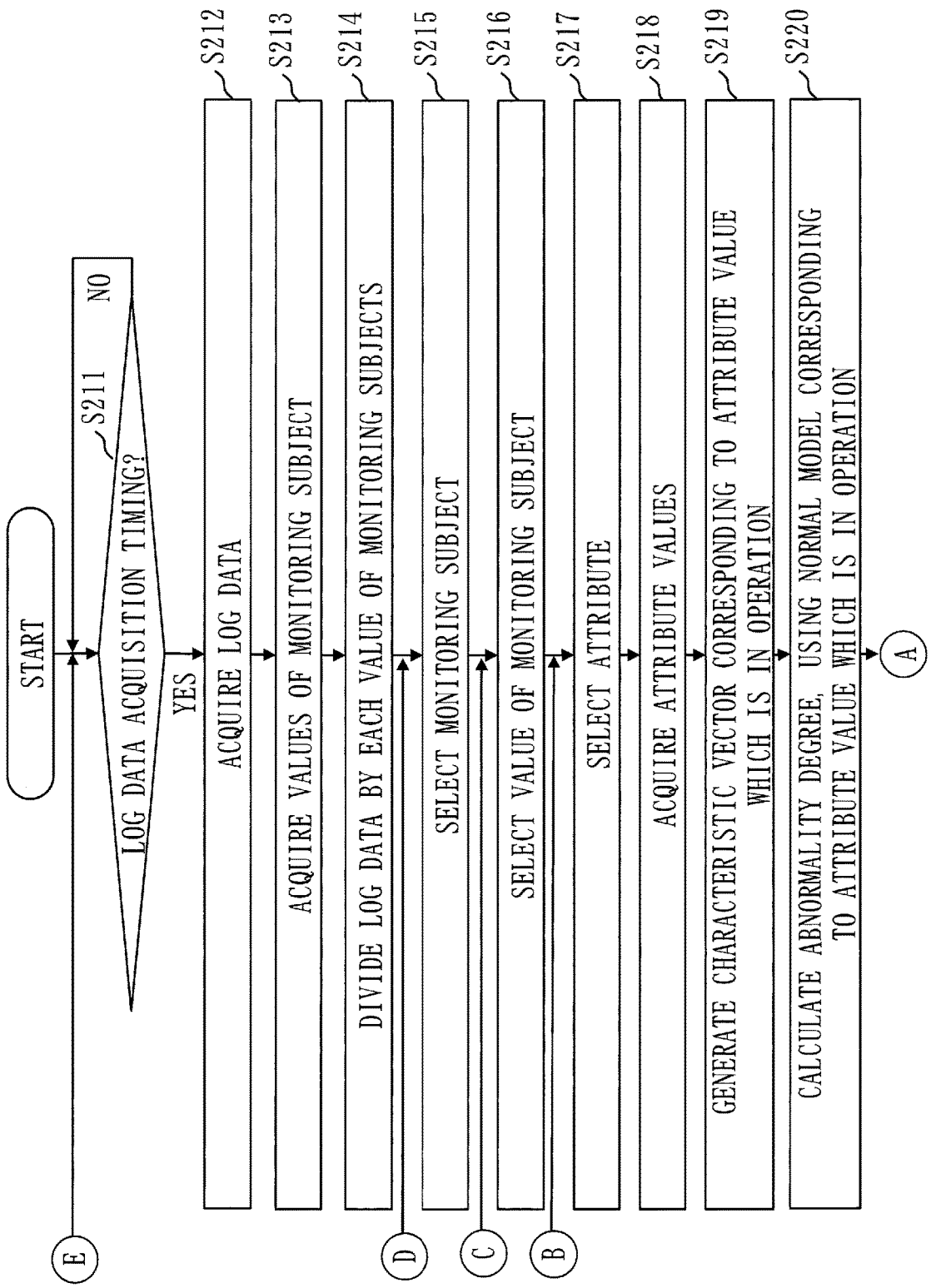
FIG. 19 is a flowchart illustrating details of the operation of the anomaly detection apparatus according to the first embodiment.
Figure 20:
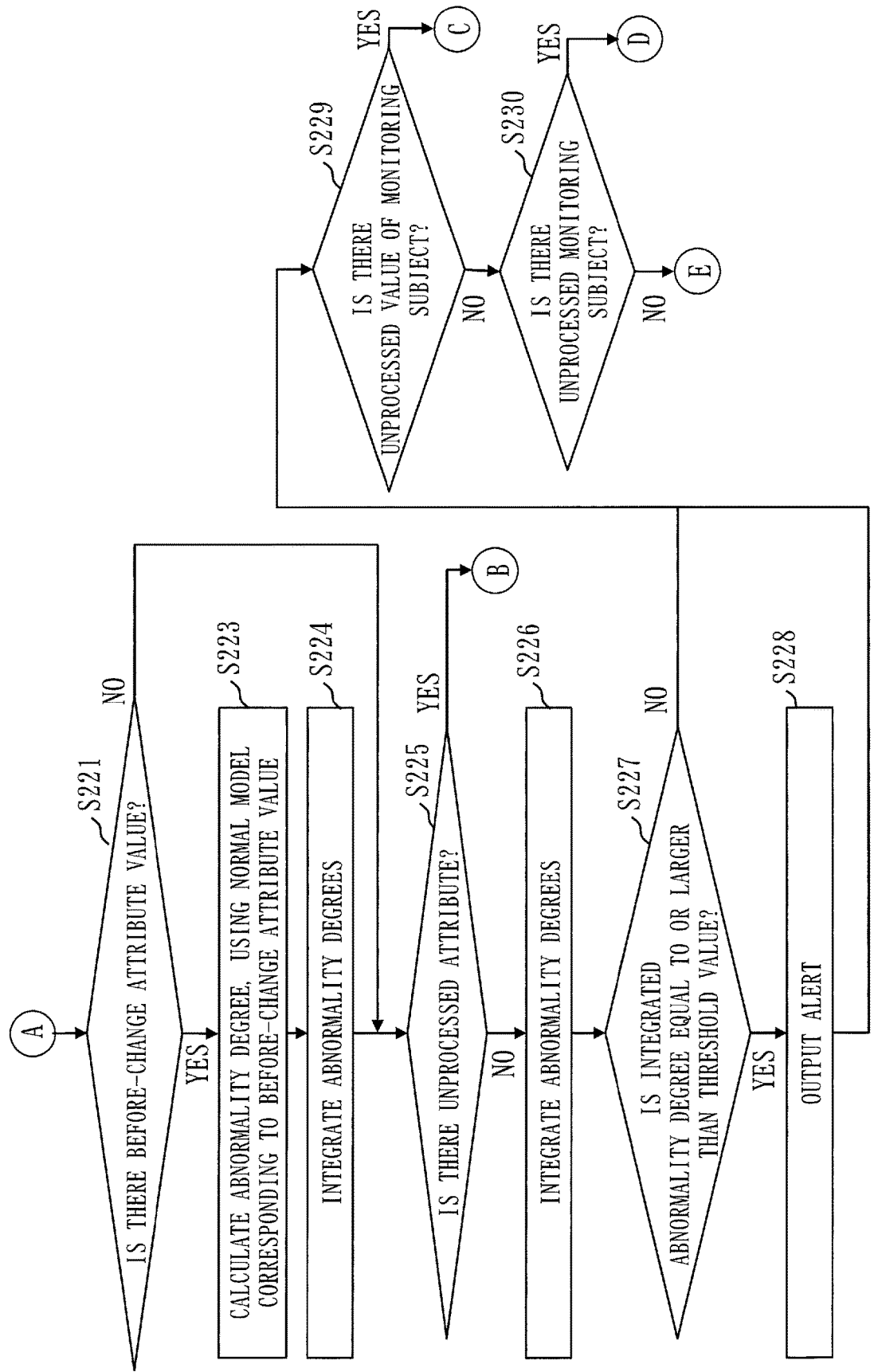
FIG. 20 is a flowchart illustrating the details of the operation of the anomaly detection apparatus according to the first embodiment.

FIGS. 19 and 20 illustrate details of the operation of the detection processing unit 202.

First, in step S211, the attribute-value acquisition unit 203 determines whether or not the current time is log-data acquisition timing. If the current time is the log-data acquisition timing, in step S212, the attribute-value acquisition unit 203 acquires the log data from the log-data accumulation DB 212.

Note that, the attribute-value acquisition unit 203 deletes the acquired log data from the log-data accumulation DB 212.

Next, in step S213, the attribute-value acquisition unit 203 acquires for each of a plurality of monitoring subjects, the concrete values of the monitoring subject from the monitoring-subject management DB 211.

For example, if there are a user account, an IP address, and a network address as three types of monitoring subjects, the attribute-value acquisition unit 203 acquires the concrete values of the monitoring subject, for each of the user account, the IP address, and the network address. For example, for the IP address, the attribute-value acquisition unit 203 acquires the concrete values of the monitoring subject such as "IP1.5" and "IP1.6".

Next, in step S214, the attribute-value acquisition unit 203 divides the log data 500 by each concrete value (for example, "IP1.5") of the monitoring subjects acquired in step S213.

More specifically, the attribute-value acquisition unit 203 divides the log data 500 read in step S211 by a unit of the concrete value of the monitoring subject acquired in step S213, and generates the pieces of division data.

That is, the division-data generation unit 102 extracts from the log data 500, the records including the concrete values of the monitoring subjects acquired in step S213, collects the extracted records, and generates the division data of each concrete value of the monitoring subjects acquired in step S213.

Next, in step S215, the attribute-value acquisition unit 203 selects a monitoring subject from among the plurality of monitoring subjects acquired in step S213. For example, the attribute-value acquisition unit 203 selects the monitoring subject according to order of descriptions in the monitoring-subject management DB 211. Below, an explanation will be given on an example in which the IP address has been selected.

Next, in step S216, the attribute-value acquisition unit 203 selects the concrete value (for example, "IP1.5") of the monitoring subject selected in step S215. The attribute-value acquisition unit 203 selects the concrete value of the monitoring subject, for example, according to order of descriptions in the monitoring-subject management DB 211.

Next, in step S217, the attribute-value acquisition unit 203 selects the attribute. In the example of FIG. 11, the attribute-value acquisition unit 203 selects an attribute from among the attributes 1 to n. For example, the attribute-value acquisition unit 203 selects the attribute according to order of descriptions in the monitoring-subject management DB 211.

Next, in step S218, the attribute-value acquisition unit 203 acquires from the monitoring-subject management DB 211, the attribute values of the attribute selected in step S217. If there are the before-change attribute value and the after-change attribute value with respect to the attribute selected in step S217, the attribute-value acquisition unit 203 acquires both the before-change attribute value and the after-change attribute value.

In step S219, the attribute-value acquisition unit 203 generates the characteristic vector corresponding to the attribute value which is in operation. In the example of FIG. 11, if an attribute 1 is selected in step S216, the attribute-value acquisition unit 203 generates the characteristic vector since the after-change attribute value (human resources department) of the attribute 1 is in operation. On the other hand, if an attribute 2 is selected in step S216, the attribute-value acquisition unit 203 does not generate the characteristic vector since the after-change attribute value (department chief) of the attribute 2 is out of operation. Also, in this step, the attribute-value acquisition unit 203 does not generate the characteristic vector for the before-change attribute value.

The attribute-value acquisition unit 203 refers to the characteristic DB 215, extracts from the division data on the monitoring subject selected in step S215, the characteristic values of the attribute value which is in operation, and generates the characteristic vector based on the extracted characteristic values.

Next, in step S220, the anomaly detection unit 205 performs the anomaly detection, using the normal model 400 corresponding to the attribute value which is in operation, and calculates the abnormality degree.

More specifically, the normal-model acquisition unit 204 acquires from the normal-model management DB 213, the normal model 400 corresponding to the attribute value which is in operation. Then, the anomaly detection unit 205 performs the anomaly detection on the characteristic vector generated in step S219, using the normal model 400 acquired by the normal-model acquisition unit 204, and calculates the abnormality degree.

Next, in step S221, the attribute-value acquisition unit 203 determines whether or not there is the before-change attribute value with respect to the attribute value acquired in step S218.

If there is the before-change attribute value with respect to the attribute value acquired in step S218, the process proceeds to step S223. On the other hand, if there is no before-change attribute value with respect to the attribute value acquired in step S218, the process proceeds to step S225. Note that, even if there is the before-change attribute value with respect to the attribute value acquired in step S218, the process proceeds to step S225 when the before-change attribute value is out of operation.

In step S223, the anomaly detection unit 205 performs the anomaly detection, using the normal model 400 corresponding to the before-change attribute value, and calculates the abnormality degree.

More specifically, the normal-model acquisition unit 204 acquires the normal model 400 corresponding to the before-change attribute value from the normal-model management DB 213. Then, the anomaly detection unit 205 performs the anomaly detection on the characteristic vector generated in step S219, using the normal model 400 acquired by the normal-model acquisition unit 204, and calculates the abnormality degree.

Next, in step S224, the anomaly detection unit 205 obtains the weighted average of the abnormality degree of the before-change attribute value and the abnormality degree of the after-change attribute value, and integrates the abnormality degree of the before-change attribute value and the abnormality degree of the after-change attribute value.

Specifically, the anomaly detection unit 205 refers to the time point to start the after-change attribute value described in the monitoring-subject management DB 211, and obtains an after-change time period t which is a period of time from the time point to start the after-change attribute value until the current time. Then, the anomaly detection unit 205 calculates the weighted average of the abnormality degree of the before-change attribute value and the abnormality degree of the after-change attribute value, using the after-change time period t, and obtains the integrated abnormality degree. A calculation method of the weighted average is, for example, as follows.

integrated abnormality degree=α*abnormality degree of before-change attribute value+(1−α)*abnormality degree of after-change attribute value    equation 1

$\alpha=1/(t^{\beta}+1)$    equation 2

In the above-indicated equations 1 and 2, the shorter the after-change time period t is, the more strongly the abnormality degree of the before-change attribute value is reflected on the integrated abnormality degree. Also, the longer the after-change time period t is, the more strongly the abnormality degree of the after-change attribute value is reflected on the integrated abnormality degree. "β" indicated in the equation 2 is a constant parameter which adjusts a degree of reflection of the after-change time period t on the integrated abnormality degree.

In step S225, the attribute-value acquisition unit 203 determines whether or not there is an unprocessed attribute. In the example of FIG. 11, the attribute-value acquisition unit 203 determines whether or not the process of step S217 and the processes after step S217 have been performed on all of the attributes 1 to n.

If there is the unprocessed attribute, the process returns to step S217, and the attribute-value acquisition unit 203 selects an attribute from among the unprocessed attribute(s).

On the other hand, if there is no unprocessed attribute, the process proceeds to step S226.

In step S226, the anomaly detection unit 205 integrates the abnormality degree of each attribute. In the example of FIG. 11, the anomaly detection unit 205 integrates the abnormality degree of each of the attributes 1 to n.

Specifically, the anomaly detection unit 205 integrates the abnormality degree of each attribute in a method below.

[formula 1]

$$\text{integrated abnormality degree} = \frac{o_1 \times k_1 \times a_1 + o_2 \times k_2 \times a_2 + \ldots o_n \times k_n \times a_n}{K}$$    equation 3

Note that, in the equation 3, K is obtained by an equation 4 below.

$K = o_1 * k_1 + o_2 * k_2 + \ldots o_n * k_n$    equation 4

Note that, in the equation 3, $a_i$ is an abnormality degree of an attribute i. In the equations 3 and 4, $o_i$ is a flag indicating whether the attribute i is in operation or out of operation. $k_i$ is a weight of the attribute i. $o_i$ and $k_i$ are defined in the monitoring-subject management DB 211 in advance.

Next, in step S227, the anomaly detection unit 205 determines whether or not the integrated abnormality degree obtained in step S226 is equal to or larger than a threshold value.

If the integrated abnormality degree is smaller than the threshold value, the process proceeds to step S229.

On the other hand, if the integrated abnormality degree is equal to or larger than the threshold value, the process proceeds to step S228.

In step S228, the anomaly detection unit 205 outputs the alert 600.

In step S229, the attribute-value acquisition unit 203 determines whether or not there is an unprocessed concrete value of the monitoring subject.

The attribute-value acquisition unit 203 determines whether or not the process of step S216 and the processes after step S216 have been performed on, for example, all of the IP addresses described in FIG. 11.

If there is the unprocessed concrete value of the monitoring subject, the process returns to step S216, and the attribute-value acquisition unit 203 selects a concrete value (for example, "IP1.6") from among the unprocessed concrete value(s) of the monitoring subject.

If there is no unprocessed concrete value of the monitoring subject, the process proceeds to step S230.

In step S230, the attribute-value acquisition unit 203 determines whether or not there is un processed monitoring subject.

The attribute-value acquisition unit 203 determines whether or not the process of step S215 and the processes after step S215 have been performed on, for example, all of the user account, the IP address, and the network address.

If there is the unprocessed monitoring subject, the process returns to step S215, and the attribute-value acquisition unit 203 selects a monitoring subject (for example, the network address) from among the unprocessed monitoring subject(s).

If there is no unprocessed monitoring subject, the process returns to step S211, and the attribute-value acquisition unit 203 acquires the log data when the acquisition timing of the log data comes.

Description of Effect of Embodiment

Above, according to the present embodiment, since the normal model is generated for each model-generation attribute value, highly-accurate anomaly detection is possible. That is, since the anomaly detection is performed, using the normal model generated for each model-generation attribute value, the highly-accurate anomaly detection is possible.

Further, according to the present embodiment, the normal model is generated based on the combination of characteristics extracted from the consistency-confirmed division data. Therefore, the highly-accurate anomaly detection is possible.

Further, according to the present embodiment, since it is possible to flexibly respond to a change of trends such as a change of the affiliation or/and the post and a change of a period of time (busy season/slow season), it is possible to prevent false detection in the anomaly detection.

Second Embodiment

In the present embodiment, a modification example on a procedure for calculating the abnormality degree by the anomaly detection apparatus 200 will be described.

In the present embodiment, mainly matters different from the first embodiment will be described.

Note that, matters not described below are the same as those in the first embodiment.

Description of Configuration

A configuration example of the anomaly detection system 1000 according to the present embodiment is as illustrated in FIG. 1.

Further, a hardware configuration example of the model generation apparatus 100 according to the present embodiment is as illustrated in FIG. 2.

A hardware configuration example of the anomaly detection apparatus 200 according to the present embodiment is as illustrated in FIG. 3.

A functional configuration example of the model generation apparatus 100 according to the present embodiment is as illustrated in FIG. 4.

A functional configuration example of the anomaly detection apparatus 200 according to the present embodiment is as illustrated in FIG. 5.

Further, an operation example of the model generation apparatus 100 according to the present embodiment is as illustrated in FIG. 12 and FIGS. 14 to 17.

Description of Operation

Figure 21:
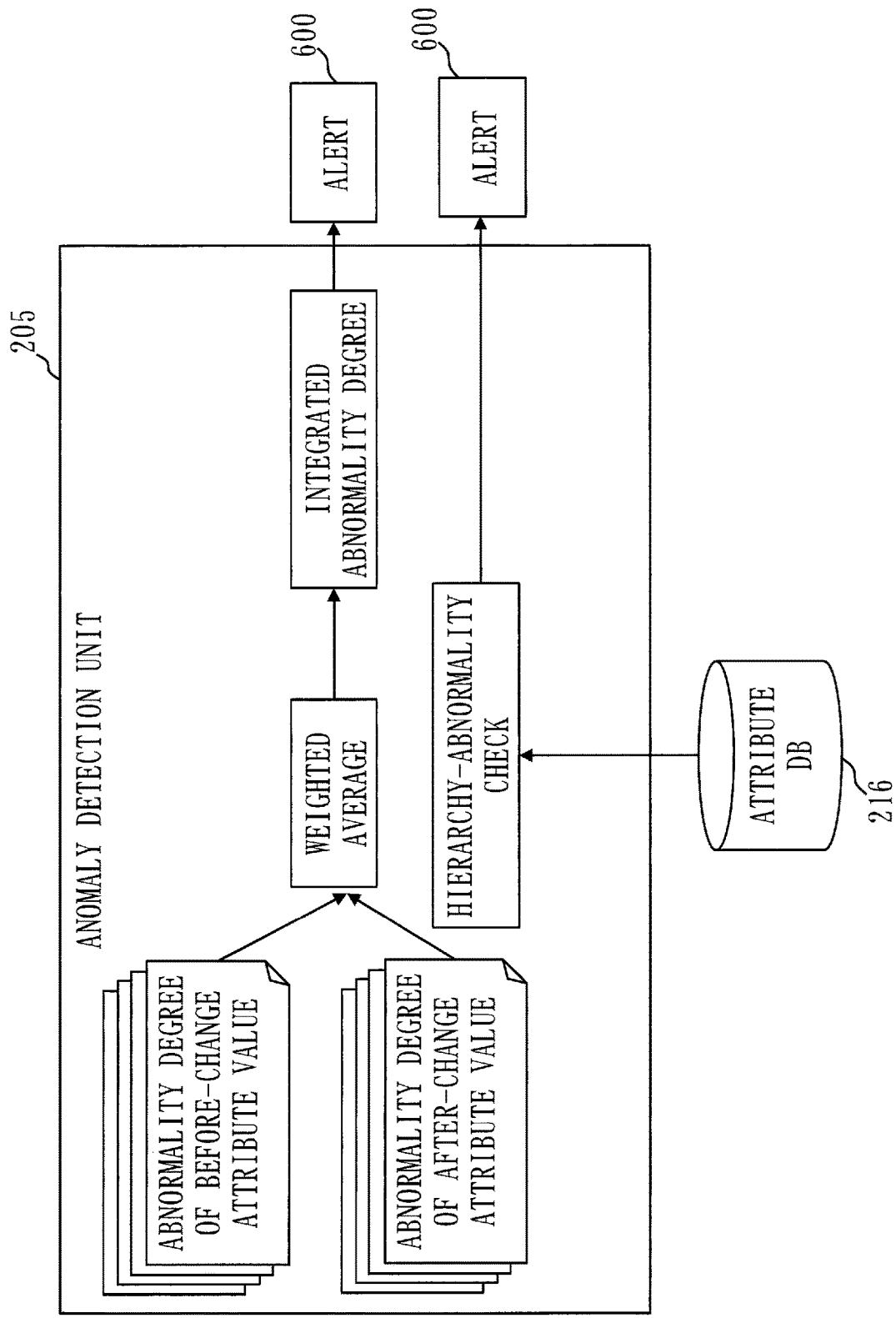
FIG. 21 is a diagram illustrating an outline of operation of an anomaly detection apparatus according to a second embodiment.

FIG. 21 illustrates an outline of operation of the anomaly detection apparatus 200 according to the present embodiment.

FIG. 21 illustrates only an operation part of the anomaly detection unit 205 illustrated in FIG. 13.

In FIG. 21, hierarchy-abnormality check is added, and FIG. 21 indicates that the alert 600 is output as a result of the hierarchy-abnormality check. Since the other elements for FIG. 21 are the same as those in FIG. 13, descriptions will be omitted.

In the present embodiment, the anomaly detection unit 205 performs the hierarchy-abnormality check after the attribute values for each attribute are obtained. The anomaly detection unit 205 obtains an abnormality degree based on the hierarchy-abnormality check, by performing the hierarchy-abnormality check. Then, the anomaly detection unit 205 outputs the alert 600 if the abnormality degree based on the hierarchy-abnormality check is equal to or larger than a threshold value.

In the present embodiment, the anomaly detection unit 205 performs the hierarchy-abnormality check if the attribute value associated with the monitoring subject is a hierarchical-structure attribute value.

The hierarchical-structure attribute value is an attribute value belonging to a hierarchical-structure attribute. The hierarchical-structure attribute is an attribute in which a plurality of attribute values constitute the hierarchical structure. For example, the attribute "post" corresponds to the hierarchical-structure attribute since the attribute values constitutes the hierarchical structure as seen in "president-executive officer-director-department manager-department chief-staff".

It is assumed that a person of an attribute value at a high hierarchical level is given strong (broad) access permission. Since access permission given to a person of an attribute value at a low hierarchical level is limited, the person of the attribute value at the low hierarchical level usually cannot access a file, a directory, an intranet, and the like accessible to the person of the attribute value at the high hierarchical level. On the other hand, the person of the attribute value at the high hierarchical level can access a file, a directory, an intranet, and the like accessible to the person of the attribute value at the low hierarchical level.

However, the person of the attribute value at the high hierarchical level rarely accesses the file, the directory, the intranet, and the like which are usually accessed by the person of the attribute value at the low hierarchical level. For example, a president rarely accesses a source code usually accessed by a staff. Therefore, it is considered that an action that the person of the attribute value at the high hierarchical level accesses the file and the like which are to be accessed by the person of the attribute value at the low hierarchical level is not normal behavior, which may be an attack.

In the present embodiment, when the attribute value associated with the monitoring subject is the hierarchical-structure attribute value, the anomaly detection unit 205 analyzes behavior occurred relevantly to the monitoring subject. Specifically, the anomaly detection unit 205 determines whether or not the behavior occurred relevantly to the monitoring subject corresponds to behavior of the hierarchical-structure attribute value at a lower hierarchical level than that of the hierarchical-structure attribute value associated with the monitoring subject. Then, if the behavior occurred relevantly to the monitoring subject corresponds to the behavior of the hierarchical-structure attribute value at the lower hierarchical level, the anomaly detection unit 205 calculates the abnormality degree based on a difference in the hierarchical level between the hierarchical-structure attribute value associated with the monitoring subject and the hierarchical-structure attribute value at the lower hierarchical level. Further, the anomaly detection unit 205 performs the anomaly detection, using the calculated abnormality degree.

FIG. 22 illustrates an operation example of the anomaly detection unit 205 according to the present embodiment. In the present embodiment, the anomaly detection unit 205 performs a procedure illustrated in FIG. 22 in addition to the procedures illustrated in FIGS. 19 and 20.

In step S251, the anomaly detection unit 205 determines whether or not the attribute value associated with the monitoring subject is the hierarchical-structure attribute value.

Specifically, the anomaly detection unit 205 determines whether or not the attribute value acquired in step S211 in FIG. 19 is the hierarchical-structure attribute value.

The anomaly detection unit 205 can determine whether or not the attribute associated with the monitoring subject is the hierarchical-structure attribute, by referring to the column of the hierarchical structure in the attribute DB 216.

If the attribute value acquired in step S211 in FIG. 19 is the hierarchical-structure attribute value, the process proceeds to step S252. On the other hand, if the attribute value acquired in step S211 in FIG. 19 is not the hierarchical-structure attribute value, the anomaly detection unit 205 ends the process.

In step S252, the anomaly detection unit 205 classifies the division data acquired in step S214 in FIG. 19 by using a discriminator corresponding to the attribute of the division data.

Classifying the division data acquired in step S214 in FIG. 19 by using the discriminator is equivalent to analyzing the behavior occurred relevantly to the monitoring subject. The division data indicates the behavior occurred relevantly to the monitoring subject. The anomaly detection unit 205 determines whether or not the behavior occurred relevantly to the monitoring subject is appropriate as the behavior of the corresponding hierarchical-structure attribute value, by classifying the division data by the discriminator.

Here, the division data of "department manager" is assumed.

In this case, the anomaly detection unit 205 classifies the division data of "department manager" by a discriminator corresponding to "post". Note that, the anomaly detection unit 205 can recognize the discriminator to be used in step S252 by referring to the column of "discriminator" in the model characteristic DB 214.

Next, in step S253, the anomaly detection unit 205 determines whether or not the hierarchical-structure attribute value at a lower level has been acquired as a result of step S252.

In the above-described example, the anomaly detection unit 205 determines whether or not the division data of "department manager" has been classified by the discriminator corresponding to "post", into the division data of a post lower than "department manager" (the division data of "department chief" or the division data of "staff").

If the hierarchical-structure attribute value at the lower level has been acquired, the process proceeds to step S254. On the other hand, if the hierarchical-structure attribute value at the lower level has not been acquired, the anomaly detection unit 205 ends the process.

In step S254, the anomaly detection unit 205 determines a difference in the hierarchical level between the hierarchical level of the division data and the hierarchical level from the classification result.

That is, the anomaly detection unit 205 determines how many hierarchical levels the hierarchical level of the division data and the hierarchical level from the classification result are far from each other in the hierarchical structure of "president-executive officer-director-department manager-department chief-staff".

If the hierarchical level of the division data is the "department manager", and the classification result is the "department chief", the both are far from each other by one hierarchical level. If the hierarchical level of the division data is the "department manager", and the classification result is the "staff", the both are far from each other by two hierarchical levels.

Next, in step S255, the anomaly detection unit 205 calculates the abnormality degree based on the difference in the hierarchical level determined in step S254.

For example, the anomaly detection unit 205 calculates the abnormality degree based on the difference in the hierarchical level, using equations 5 and 6 below.

$$\text{abnormality degree } 2 = \lambda * \text{abnormality degree } 1 \quad \text{equation 5}$$

$$\lambda = 1 - \{1/(d+c)\} \quad \text{equation 6}$$

In the equation 5, the abnormality degree 1 is the abnormality degree which is calculated in step S216 in FIG. 19, the abnormality degree of the before-change attribute value which is calculated in step S220, or the abnormality degree of the after-change attribute value which is calculated in step S220. The abnormality degree 2 is the abnormality degree based on the hierarchy-abnormality check.

Also, in the equation 6, d is the difference in the hierarchical level, and c is an adjustment-purpose constant parameter.

Next, in step S256, the anomaly detection unit 205 determines whether or not the abnormality degree calculated in step S255 is equal to or larger than a threshold value.

If the abnormality degree calculated in step S255 is equal to or larger than the threshold value, the process proceeds to step S257. On the other hand, if the abnormality degree calculated in step S255 is smaller than the threshold value, the anomaly detection unit 205 ends the process.

In step S257, the anomaly detection unit 205 outputs the alert 600.

Description of Effect of Embodiment

In the present embodiment, the anomaly detection is performed also when the behavior of the attribute value at a higher hierarchical level corresponds to the behavior of the attribute value at a lower hierarchical level. Therefore, according to the present embodiment, it is possible to early detect a possibility of an attack.

Although the first and second embodiments have been described above, these two embodiments may be combined and implemented.

Alternatively, one of these two embodiments may be partially implemented.

Alternatively, these two embodiments may be partially combined and implemented.

Further, the configurations and the procedures described in these two embodiments may be modified as necessary.

Supplementary Description of Hardware Configuration

Finally, supplementary descriptions of the hardware configurations of the model generation apparatus 100 and the anomaly detection apparatus 200 will be given.

Each of the processor 151 and the processor 251 is an IC (Integrated Circuit) that performs processing.

Each of the processor 151 and the processor 251 is a CPU (Central Processing Unit), a DSP (Digital Signal Processor), or the like.

Each of the main storage device 152 and the main storage device 252 is a RAM (Random Access Memory).

Each of the auxiliary storage device 153 and the auxiliary storage device 253 is a ROM (Read Only Memory), a flash memory, an HDD (Hard Disk Drive), or the like.

Each of the communication device 154 and the communication device 254 is an electronic circuit that executes a communication process of data.

Each of the communication device 154 and the communication device 254 is, for example, a communication chip or an NIC (Network Interface Card).

Each of the input/output device 155 and the input/output device 255 is a keyboard, a mouse, a display device, or the like.

Further, the auxiliary storage device 153 also stores an OS (Operating System).

Then, a part of the OS is executed by the processor 151.

While executing at least the part of the OS, the processor 151 executes the programs which realize the functions of the attribute-value extraction unit 101, the division-data generation unit 102, the characteristic selection unit 103, and the normal-model generation unit 104.

By the processor 151 executing the OS, task management, memory management, file management, communication control, and the like are performed.

Further, at least one of information, data, a signal value, and a variable value that indicate results of processes of the attribute-value extraction unit 101, the division-data generation unit 102, the characteristic selection unit 103, and the normal-model generation unit 104 is stored in at least one of the main storage device 152, the auxiliary storage device 153, and a register and a cash memory in the processor 151.

Further, the programs which realize the functions of the attribute-value extraction unit 101, the division-data generation unit 102, the characteristic selection unit 103, and the normal-model generation unit 104 may be stored in a portable recording medium such as a magnetic disk, a flexible disk, an optical disc, a compact disc, a Blu-ray (registered trademark) disc, or a DVD. Further, the portable recording medium storing the programs which realize the functions of the attribute-value extraction unit 101, the division-data generation unit 102, the characteristic selection unit 103, and the normal-model generation unit 104 may be distributed.

Further, "unit" of the attribute-value extraction unit 101, the division-data generation unit 102, the characteristic selection unit 103, and the normal-model generation unit 104 may be read as "circuit", "step", "procedure", or "process".

Further, the model generation apparatus 100 may be realized by a processing circuit. The processing circuit is, for example, a logic IC (Integrated Circuit), a GA (Gate Array), an ASIC (Application Specific Integrated Circuit), or an FPGA (Field-Programmable Gate Array).

In this case, each of the attribute-value extraction unit 101, the division-data generation unit 102, the characteristic selection unit 103, and the normal-model generation unit 104 is realized as a part of the processing circuit.

Similarly, also the auxiliary storage device 253 stores an OS.

Then, at least a part of the OS is executed by the processor 251.

While executing at least the part of the OS, the processor 251 executes the programs which realize the functions of the attribute update unit 201, the detection processing unit 202, the attribute-value acquisition unit 203, the normal-model acquisition unit 204, and the anomaly detection unit 205.

By the processor 251 executing the OS, task management, memory management, file management, communication control, and the like are performed.

Further, at least one of information, data, a signal value, and a variable value that indicate results of processes of the attribute update unit 201, the detection processing unit 202, the attribute-value acquisition unit 203, the normal-model acquisition unit 204, and the anomaly detection unit 205 is stored in at least one of the main storage device 252, the auxiliary storage device 253, and a register and a cash memory in the processor 251.

Further, the programs which realize the functions of the attribute update unit 201, the detection processing unit 202, the attribute-value acquisition unit 203, the normal-model acquisition unit 204, and the anomaly detection unit 205 may be stored in a portable recording medium such as a magnetic disk, a flexible disk, an optical disc, a compact disc, a Blu-ray (registered trademark) disc, or a DVD. Further, the portable recording medium storing the programs which realize the functions of the attribute update unit 201, the detection processing unit 202, the attribute-value acquisition unit 203, the normal-model acquisition unit 204, and the anomaly detection unit 205 may be distributed.

Further, "unit" of the attribute update unit 201, the detection processing unit 202, the attribute-value acquisition unit 203, the normal-model acquisition unit 204, and the anomaly detection unit 205 may be read as "circuit", "step", "procedure", or "process".

Further, also the anomaly detection apparatus 200 may be realized by a processing circuit. The processing circuit is, as described above, a logic IC, a GA, an ASIC, or an FPGA.

In this case, each of the attribute update unit 201, the detection processing unit 202, the attribute-value acquisition unit 203, the normal-model acquisition unit 204, and the anomaly detection unit 205 is realized as a part of the processing circuit.

Note that, in the present specification, a superordinate concept of the processor and the processing circuit is referred to as "processing circuitry".

That is, each of the processor and the processing circuit is a specific example of the "processing circuitry".

REFERENCE SIGNS LIST

100: model generation apparatus, 101: attribute-value extraction unit, 102: division-data generation unit, 103: characteristic selection unit, 104: normal-model generation unit, 111: attribute DB, 112: characteristic DB, 113: normal-model management DB, 114: model characteristic DB, 151: processor, 152: main storage device, 153: auxiliary storage device, 154: communication device, 155: input/output device, 200: anomaly detection apparatus, 201: attribute update unit, 202: detection processing unit, 203: attribute-value acquisition unit, 204: normal-model acquisition unit, 205: anomaly detection unit, 211: monitoring-subject management DB, 212: log-data accumulation DB, 213: normal-model management DB, 214: model characteristic DB, 215: characteristic DB, 216: attribute DB, 251: processor, 252: main storage device, 253: auxiliary storage device, 254: communication device, 255: input/output device, 300: normal data. 400: normal model, 500: log data, 600: alert, 1000: anomaly detection system.

The invention claimed is:

1. A model generation apparatus comprising:
processing circuitry
to extract as a plurality of model-generation attribute values, a plurality of attribute values belonging to an attribute associated with a monitoring subject for anomaly detection;
to extract for each model-generation attribute value, a normal event associated with the model-generation attribute value from normal data indicating a plurality of normal events each of which is found out to be normal, each of which is associated with one attribute value of the plurality of attribute values, and each of which includes a plurality of characteristics, and generate for each model-generation attribute value, division data indicating the extracted normal event;
to select a combination of characteristics to be used for generation of a normal model to be used for anomaly detection, from a plurality of characteristics included in a plurality of normal events indicated in a plurality of pieces of division data generated for the plurality of model-generation attribute values; and to generate the normal model for each model-generation attribute value, using the combination of characteristics selected.

2. The model generation apparatus according to claim 1, wherein the processing circuitry generates a plurality of combinations of characteristics, combining the plurality of characteristics included in the plurality of normal events indicated in the plurality of pieces of division data, calculates for each generated combination of characteristics, classification accuracy which is accuracy in classifying the plurality of pieces of division data, and selects the combination of characteristics to be used for the generation of the normal model based on the calculated classification accuracy.

3. The model generation apparatus according to claim 2, wherein the processing circuitry divides the plurality of pieces of division data into learning data which is learning-purpose division data and verification data which is verification-purpose division data, performs learning using the learning data, and generates a plurality of combinations of characteristics, and calculates the classification accuracy for each combination of characteristics, using the verification data.

4. The model generation apparatus according to claim 2, wherein the processing circuitry selects as the combination of characteristics to be used for the generation of the normal model, a combination of characteristics with the least number of characteristics and the highest classification accuracy, among the plurality of combinations of characteristics.

5. The model generation apparatus according to claim 2, wherein the processing circuitry selects from among a plurality of characteristics constituting a combination of characteristics with the least number of characteristics and the highest classification accuracy, among the plurality of combinations of characteristics, one or more characteristics based on a degree of contribution to the classification accuracy of each characteristic, and selects as the combination of characteristics to be used for the generation of the normal model, a combination constituted by the selected one or more characteristics.

6. The model generation apparatus according to claim 1, wherein the processing circuitry generates the normal model for each model-generation attribute value, using a concrete value indicated in the division data and corresponding to the combination of characteristics selected.

7. The model generation apparatus according to claim 2, wherein the processing circuitry does not generate the normal model, when the combination of characteristics to be used for the generation of the normal model is not selected since the classification accuracy of all of the combinations of characteristics does not satisfy required accuracy.

8. A model generation method comprising:

extracting as a plurality of model-generation attribute values, a plurality of attribute values belonging to an attribute associated with a monitoring subject for anomaly detection;

extracting for each model-generation attribute value, a normal event associated with the model-generation attribute value from normal data indicating a plurality of normal events each of which is found out to be normal, each of which is associated with one attribute value of the plurality of attribute values, and each of which includes a plurality of characteristics, and generating division data indicating the extracted normal event;

selecting a combination of characteristics to be used for generation of a normal model to be used for anomaly detection, from a plurality of characteristics included in a plurality of normal events indicated in a plurality of pieces of division data generated for the plurality of model-generation attribute values; and generating the normal model for each model-generation attribute value, using the combination of characteristics selected.

9. A non-transitory computer readable medium storing a model generation program which causes a computer to execute:

an attribute-value extraction process of extracting as a plurality of model-generation attribute values, a plurality of attribute values belonging to an attribute associated with a monitoring subject for anomaly detection;

a division-data generation process of extracting for each model-generation attribute value, a normal event associated with the model-generation attribute value from normal data indicating a plurality of normal events each of which is found out to be normal, each of which is associated with one attribute value of the plurality of attribute values, and each of which includes a plurality of characteristics, and generating division data indicating the extracted normal event;

a characteristic selection process of selecting a combination of characteristics to be used for generation of a normal model to be used for anomaly detection, from a plurality of characteristics included in a plurality of normal events indicated in a plurality of pieces of division data generated for the plurality of model-generation attribute values; and a normal-model generation process of generating the normal model for each model-generation attribute value, using the combination of characteristics selected by the characteristic selection process.

* * * * *